(12) United States Patent
Ikeda et al.

(10) Patent No.: US 8,989,739 B2
(45) Date of Patent: Mar. 24, 2015

(54) CONNECTION METHOD, COMMUNICATION SYSTEM, MOBILE TERMINAL, INFORMATION FORWARDING DEVICE, AND SERVER

(75) Inventors: Shinkichi Ikeda, Kanagawa (JP); Takahisa Aoyama, Kanagawa (JP); Keigo Aso, Kanagawa (JP); Hidenori Matsuo, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 130 days.

(21) Appl. No.: 13/814,474

(22) PCT Filed: Sep. 7, 2011

(86) PCT No.: PCT/JP2011/005009
§ 371 (c)(1),
(2), (4) Date: Feb. 5, 2013

(87) PCT Pub. No.: WO2012/032773
PCT Pub. Date: Mar. 15, 2012

(65) Prior Publication Data
US 2013/0130686 A1 May 23, 2013

(30) Foreign Application Priority Data
Sep. 8, 2010 (JP) .................. 2010-201295

(51) Int. Cl.
*H04W 48/16* (2009.01)
*H04W 8/20* (2009.01)
(Continued)

(52) U.S. Cl.
CPC .............. *H04W 48/16* (2013.01); *H04W 8/205* (2013.01); *H04W 84/005* (2013.01); *H04W 76/023* (2013.01)
USPC ...................................... 455/435.1

(58) Field of Classification Search
CPC ... H04W 84/005; H04W 48/18; H04W 36/02; H04W 84/18; H04W 8/005; H04W 76/04
USPC .................. 455/422.1, 435.1, 452.2, 450, 68; 370/229, 230, 235
See application file for complete search history.

(56) References Cited

U.S. PATENT DOCUMENTS 8,755,804 B2 * 6/2014 Lee ............................... 455/440
2008/0248807 A1 * 10/2008 Kim et al. ..................... 455/453
(Continued)

FOREIGN PATENT DOCUMENTS

JP 2003091467 A 3/2003
JP 2005250081 A 9/2005
(Continued)

OTHER PUBLICATIONS

International Search Report dated Oct. 18, 2011, for corresponding International Application No. PCT/JP2011/005009, 2 pages.

*Primary Examiner* — Ajit Patel
(74) *Attorney, Agent, or Firm* — Seed IP Law Group PLLC

(57) ABSTRACT

A technique is disclosed for preventing a mobile terminal from unnecessarily connecting to a local connection service provided by a mobile router. In a communication system, a UE 10 sends user preference information to a forwarding node 20 before the UE connects to the forwarding node, which is installed in a moving body 110 as an access point of the UE to forward information to the UE. The forwarding node determines whether information capable of being supplied to the UE is appropriate for a user of the UE based on the preference information and sends the determination result to the UE. When the UE becomes connectable to the forwarding node, the UE does not connect to the forwarding node if the information capable of being supplied is not appropriate for the user of the UE based on the determination result; else the UE connects to the forwarding node.

10 Claims, 18 Drawing Sheets

(51) Int. Cl.
*H04W 76/02* (2009.01)
*H04W 84/00* (2009.01)

(56) References Cited

U.S. PATENT DOCUMENTS

2009/0180385 A1* 7/2009 Chen et al. .................... 370/235
2010/0214996 A1* 8/2010 Santhanam et al. .......... 370/329
2010/0281048 A1 11/2010 Nagatomo et al.
2011/0111767 A1* 5/2011 Livanos ..................... 455/452.2
2011/0194407 A1* 8/2011 Ji et al. .......................... 370/226

FOREIGN PATENT DOCUMENTS

JP 2009171039 A 7/2009
JP 2009237989 A 10/2009

* cited by examiner

CONNECTION METHOD, COMMUNICATION SYSTEM, MOBILE TERMINAL, INFORMATION FORWARDING DEVICE, AND SERVER

TECHNICAL FIELD

The present invention relates to a connection method (connection establishment method) by which a mobile terminal connects to a local connection service provided in a moving body, a communication system, a mobile terminal and an information forwarding device used in the method, and a server.

BACKGROUND ART

So far, there has been a mobile router (also called a moving router) for running a WAN (Wide Area Network) link such as a cellular link and a LAN link such as a wireless LAN (Local Area Network) at the same time to route traffic on these links bilaterally. Such a mobile router is installed in a moving body, such as a train or a bus, to accommodate, in the mobile router, mobile terminals of multiple users who happen to be on the same car in order to achieve advantageous effects, such as to reduce signaling traffic (mobility management traffic or the like) from the point of view of a cellular network and to control the peak of traffic of user data (by equalizing the traffic when the traffic frequently occurs and forwarding the traffic to the WAN link). Further, a proxy function for caching relatively frequently-accessed user data can be implemented in the mobile router or a specific content can be stored in the mobile router to reduce the traffic of user data passing through the WAN link in order to improve the usability of the system.

As a prior art technique for accessing a local connection service provided by such a mobile router or a wireless LAN access point, for example, Patent Document 1 cited below discloses a method of determining whether a mobile terminal such as a laptop computer is to connect to a neighboring local connection service depending on information on a location where the mobile terminal is positioned (e.g., at an own desk in a office, in a conference room, or on a road) and the availability of a local network type at each position (e.g., whether a contract for connection is made).

PRIOR ART DOCUMENT

Patent Document

Patent Document 1: Japanese Patent Application Publication No. 2003-91467 (FIG. 2 and FIG. 3)

However, in such a scenario that a mobile terminal moves from a platform to a moving body such as a train as mentioned above, when user data is cached or a specific content is stored in the mobile router, the determination based merely on the position of the mobile terminal and the availability of the local network type is insufficient, causing a problem that the mobile terminal could connect to a local connection service incorrectly. In other words, even when the mobile terminal actually switches from the WAN connection to the wireless LAN connection to access the local connection service provided by the mobile router, the mobile terminal may end up switching again to the direct connection to the WAN because of no desired content stored in the mobile router, or the cache efficiency may be reduced because the content accessed by the mobile terminal is different from the cached content.

SUMMARY OF INVENTION

In view of the above problems, it is an object of the present invention to provide a connection establishment method, a communication system, a mobile terminal and an information forwarding device, and a server, where when a mobile terminal moves from a platform into a moving body such as a train, the mobile terminal can be prevented from unnecessary connection establishment to a local connection service provided by a mobile router in the moving body to prevent inefficient local connection, and hence improve user convenience.

In order to attain the above object, the connection establishment method of the present invention is a connection establishment method by which a mobile terminal connects to a local connection service provided in a moving body, characterized by including:

a step of sending, by the mobile terminal, preference information on a user of the mobile terminal before the mobile terminal connects to an information forwarding device installed in the moving body as an access point of the mobile terminal to forward information to the mobile terminal;

a step of determining, by the information forwarding device, based on the sent preference information, whether the forwarded information is appropriate for the user of the mobile terminal and sending the determination result to the mobile terminal before the mobile terminal connects to the information forwarding device; and a step in which, when the mobile terminal becomes connectable to the information forwarding device, if the forwarded information is not appropriate for the user of the mobile terminal based on the determination result, the mobile terminal does not connect to the information forwarding device, or if appropriate, the mobile terminal connects to the information forwarding device.

In order to attain the above object, the communication system of the present invention is a communication system in which a mobile terminal connects to a local connection service provided in a moving body, characterized by including:

a unit for sending, by the mobile terminal, preference information on a user of the mobile terminal before the mobile terminal connects to an information forwarding device installed in the moving body as an access point of the mobile terminal to forward information to the mobile terminal;

a unit for determining, by the information forwarding device, based on the sent preference information, whether the forwarded information is appropriate for the user of the mobile terminal and send the determination result to the mobile terminal before the mobile terminal connects to the information forwarding device; and a unit by which, when the mobile terminal becomes connectable to the information forwarding device, if the forwarded information is not appropriate for the user of the mobile terminal based on the determination result, the mobile terminal does not connect to the information forwarding device, or if appropriate, the mobile terminal connects to the information forwarding device.

In order to attain the above object, the information forwarding device of the present invention is an information forwarding device installed in a moving body as an access point of a mobile terminal to forward information to the mobile terminal in a communication system in which the mobile terminal connects to a local connection service provided in the moving body, characterized by including:

a unit for receiving preference information on a user of the mobile terminal sent by the mobile terminal before the mobile terminal connects to the information forwarding device;

a unit for determining, based on the sent preference information, whether the forwarded information is appropriate for the user of the mobile terminal and sending the determination result to the mobile terminal before the mobile terminal connects to the information forwarding device; and a unit for sending the forwarded information to the mobile terminal when the mobile terminal connects to the information forwarding device.

In order to attain the above object, the mobile terminal of the present invention is a mobile terminal for connecting to a local connection service provided in a moving body, characterized by including:

a unit for sending preference information on a user of the mobile terminal before connecting to an information forwarding device installed in the moving body as an access point of the mobile terminal to forward information to the mobile terminal;

a unit for receiving a determination result sent by the information forwarding device before connecting to the information forwarding device, where the determination is made based on the sent preference information as to whether the forwarded information is appropriate for the user of the mobile terminal; and a unit which, when the mobile terminal becomes connectable to the information forwarding device, if the forwarded information is not appropriate for the user of the mobile terminal based on the determination result, does not connect to the information forwarding device, or if appropriate, connects to the information forwarding device.

In order to attain the above object, the server of the present invention is a server holding neighborhood information on an information forwarding device installed in a moving body as an access point of a mobile terminal to forward information to the mobile terminal in a communication system in which the mobile terminal connects to a local connection service provided in the moving body, characterized by including:

a unit for receiving preference information on a user of the mobile terminal before the mobile terminal connects to the information forwarding device; and a unit for forwarding the sent preference information to the information forwarding device to which the mobile terminal is going to connect.

According to this structure, the information forwarding device determines, based on the acquired preference information on the mobile terminal, whether the forwarded information is appropriate for the user of the mobile terminal, and when the forwarded information is not appropriate for the user of the mobile terminal based on the determination result, the mobile terminal does not connect to the information forwarding device. This can prevent the mobile terminal from unnecessary connection establishment to a local connection service provided by a mobile router in the moving body to prevent inefficient local connection, and hence improve user convenience.

According to the present invention, when a mobile terminal moves from a platform into a moving body such as a train, the mobile terminal can be prevented from unnecessary connection establishment to a local connection service provided by a mobile router in the moving body to prevent inefficient local connection, and hence improve user convenience.

DESCRIPTION OF EMBODIMENTS

Embodiments of the present invention will now be described with reference to the accompanying drawings.

First Embodiment

In this embodiment, a determination is made before switching as to whether a content or the status of a cache provided by a local connection service as a switching destination of the mobile terminal is appropriate for a user of the mobile terminal (at the moment or by the time the mobile terminal is connected) based on information (preference information or the like) acquired from the mobile terminal, and only when the determination result is that the content or the status of the cache is appropriate for the user of the mobile terminal, a new connection of the mobile terminal to the local connection service or handover from the WAN connection is permitted.

<System Configuration>

Figure 1:
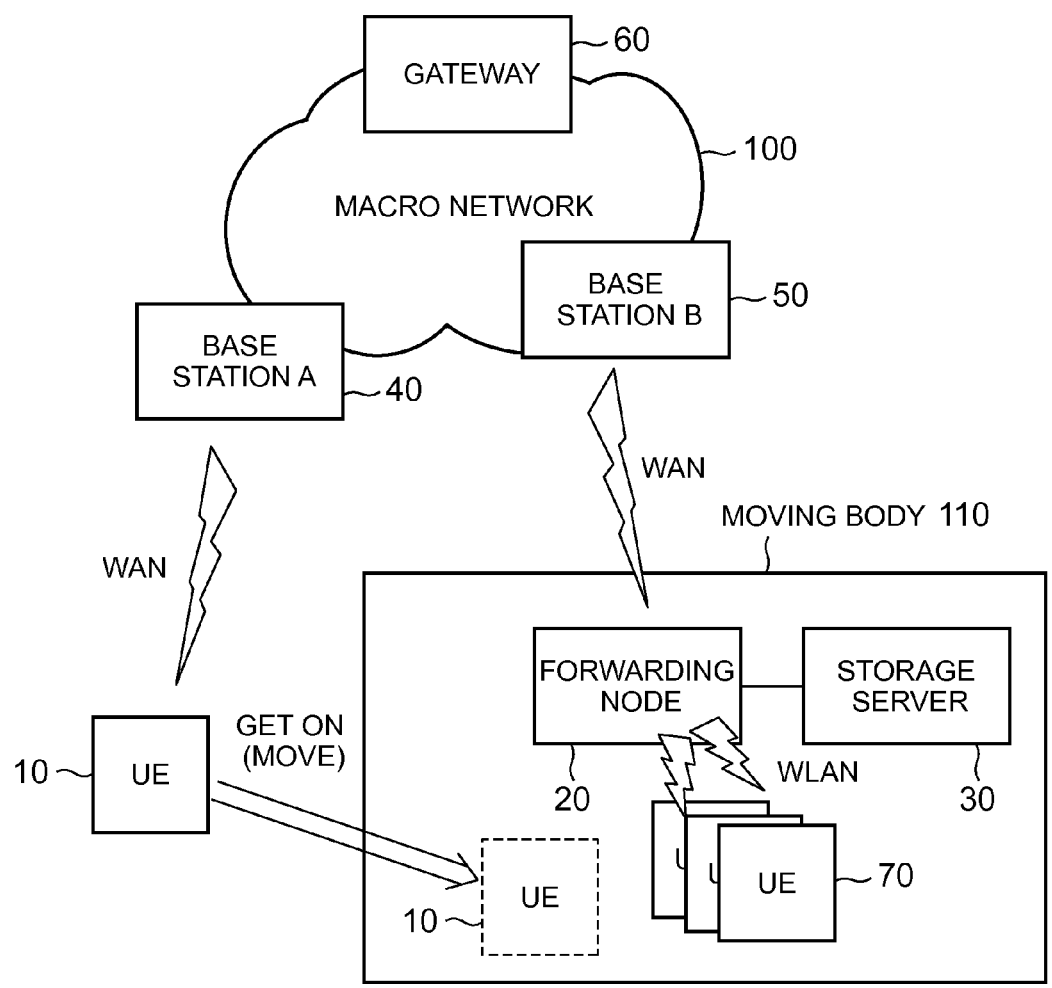
FIG. 1 is a diagram showing a system configuration according to a first embodiment of the present invention.

FIG. 1 is a diagram showing a system configuration according to the first embodiment of the present invention. In FIG. 1, it is assumed that a UE (User Equipment) 10 is a mobile terminal to connect to a macro network 100 and is connectable to a forwarding node 20 in a moving body 110 such as a train when the UE 10 moves from the outside of the moving body 110 into the moving body 110 as indicated by the arrow. A base station 40 (base station A) accommodates the UE 10 through a cellular line (WAN connection) in the macro network 100, and a gateway 60 accommodates, in the macro network 100, a connection from the UE 10 via the base station 40. Here, the macro network 100 is an operator network providing a WAN connection through the cellular line, which is also called a core network or the like. The forwarding node 20 is also called a forwarding device or an information forwarding device, which can be used as a mobile router having a handover function between 3GPP (3rd Generation Partnership Project) network-WLAN, a mobile relay having a handover function between 3GPP macro networkE3GPP local network, or the like.

A UE 70 is located in the moving body 110 and different from the UE 10. A forwarding node 20 accommodates the UE 70 and the UE 10 moved into the moving body 110 through local wireless connection (WLAN connection). A base station 50 (base station B) accommodates the forwarding node 20 through a cellular line (WAN connection) in the macro network 100. A storage server 30 is connected to the forwarding node 20 to operate a proxy function for caching traffic of user data forwarded by the forwarding node 20 and store contents to be delivered to the UE 10 and 70 in the moving body 110 through the forwarding node 20. The gateway 60 on the macro network 100 side accommodates connections (on the moving body side) via the base station 50 by means of the forwarding node 20. For the sake of simplifying the description, the UE 10 and the forwarding node 20 are accommodated in the same gateway 60 in FIG. 1, but they may be connected to different gateways, respectively.

<System Operation>

Figure 2:
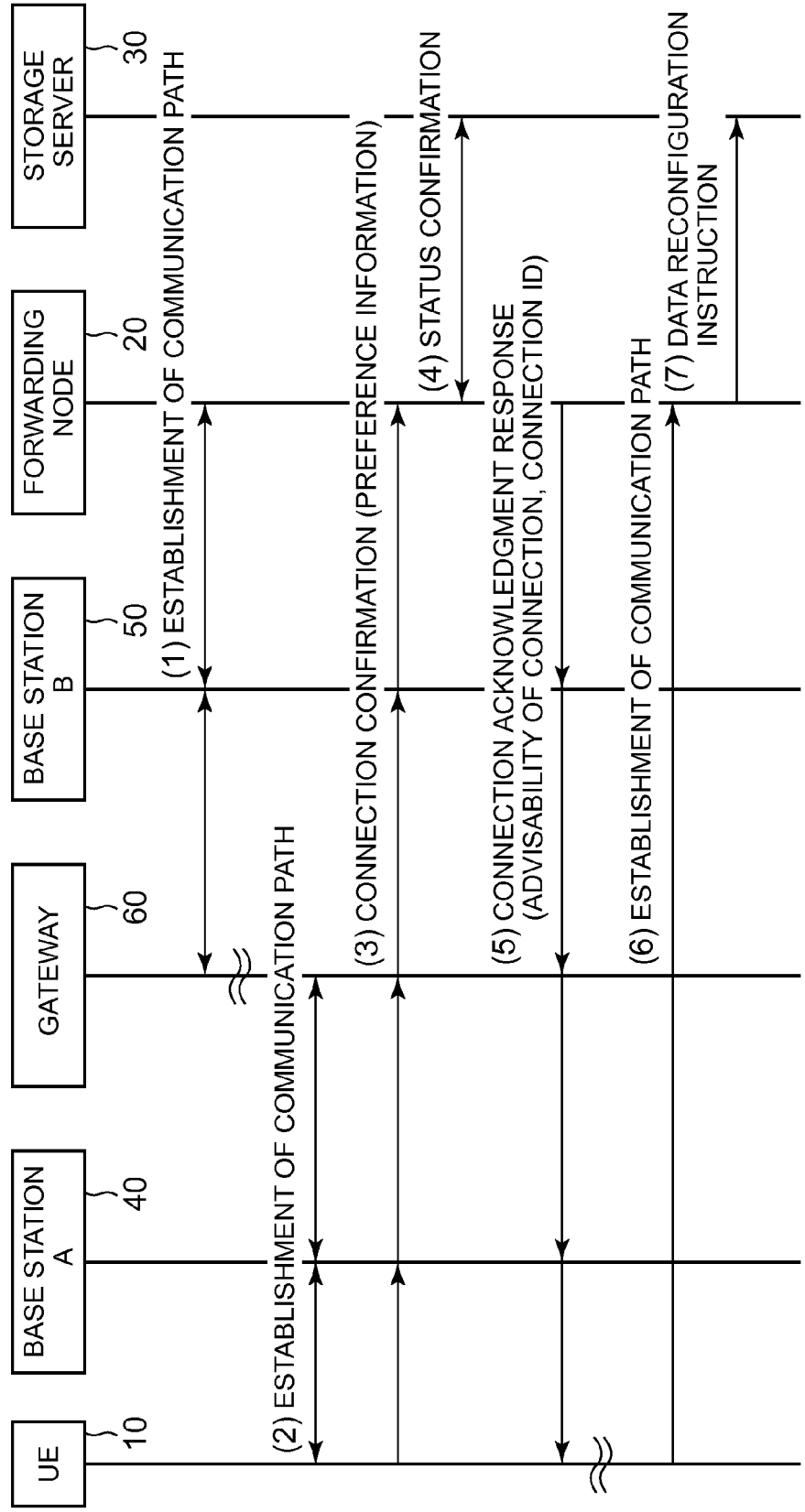
FIG. 2 is a communication sequence chart for describing the operation of the system of FIG. 1.

The operation of a system having the above configuration will be described with reference to a communication sequence shown in FIG. 2.

(1) Establishment of Communication Path: First, before the UE 10 moves into the moving body 110, the forwarding node 20 establishes a communication path with the gateway 60 via the base station 50. The communication path here is a communication connection in a cellular system, such as UMTS (Universal Mobile Telecommunication System), GPRS (General Packet Radio Service), LTE (Long Term Evolution), or SAE (System Architecture Evolution), which is also called a PDP (Packet Data Protocol) context, a PDN (Packet Data Network) connection, or an SAE bearer depending on the system. Further, the establishment of the communication connection is any one of an Attach procedure, an Activate PDP Context procedure, a Service Request procedure, and a Handover procedure provided in 3GPP TS23.060, and an Attach procedure, a Service Request procedure, and a Handover procedure provided in 3GPP TS23.401 or 3GPP TS23.402. By establishing a communication connection, an IP (Internet Protocol) address is allocated (or reassigned upon handover) to the forwarding node 20 from the gateway 60, enabling communication with an external node, not shown in the figures.

(2) Establishment of Communication Path: Likewise, before the UE 10 moves into the moving body 110, the UE 10 also establishes a communication path with the gateway 60 through the WAN-side base station 40. This also leads to issuing an IP address to the UE 10 from the gateway 60, enabling communication with an external node, not shown in the figures. Note that the timing of establishing the communication path by the forwarding node 20 does not need to be synchronized with the timing of establishing the communication path by the UE 10.

(3) Connection Confirmation: After completion of the establishment of the communication paths at (1) and (2) mentioned above, the UE 10 confirms connection to the forwarding node 20 at any timing via the WAN-side base station 40, the gateway 60, and the moving body-side base station 50. For example, this scenario assumes a case where a user having the UE 10 is waiting on a platform for the moving body 110 as a train scheduled to get on.

Here, the forwarding node 20 and the storage server 30 connected thereto are installed in the moving body 110 scheduled for the user to get on, to cache traffic of user data from the UE 70 that happens to be on the moving body 110. When a data request from the UE 70 hits cached data, the corresponding data is forwarded from the storage server 30 to the UE 70 through the forwarding node 20 so that the traffic of the forwarding node 20 through the base station 50 can be reduced. In other words, when the UE 70 accesses data of the same sort, high cache usability can be achieved, and in the best case, traffic forwarded from the forwarding node 20 to the outside becomes zero. The storage server 30 also delivers a content (e.g., newspaper data, a movie's trailer file, or any other image, video, and/or text data) desired by the UE 70. This also eliminates the need for the forwarding node 20 to acquire the content from an external server so that traffic to be forwarded to the outside can be reduced.

Through connection confirmation processing at (3) mentioned above, the UE 10 confirms the effectiveness of connecting to the forwarding node 20 installed in the train (moving body 110) scheduled to get on from now. In other words, the UE 10 sends the forwarding node 20 a connection confirmation message with preference information on the user of the UE 10 included therein. The preference information is information on contents in which the user of the UE 10 is interested or which is scheduled to use (e.g., the kind or title of a newspaper or a magazine the user subscribes to), information on a history of content data or Web accesses referred to in the past (part of or all the history of a Web browser may be used intact or after being processed). Alternatively, cache information (e.g., snapshots of data accessed by the UE 10) acquired from the forwarding node 20 when the UE 10 previously connected to the forwarding node 20 may be notified as preference information. Thus, the forwarding node 20 can perform matching using a predetermined format in connection confirmation processing to be described later, enabling reduction in the processing load on the forwarding node 20.

The UE 10 can acquire the address (IP address) of the forwarding node 20 as follows: For example, the UE 10 has a list of fixed IP addresses each of which is assigned to each train (e.g., a time table listing IP addresses each of which is assigned to each train) (i.e., the IP address is assigned to the forwarding node 20) to select a desired train based on information such as a boarding station, a boarding track number, or a train ID in order to extract an IP address from the list. The UE 10 may also make an inquiry to a DNS server, not shown in the figures, about an identifiable train name assigned to each train in a similar fashion (e.g., an identifier in the URI (Uniform Resource Locator) format)) to acquire a corresponding IP address. Further, an identifier may be made up by combining pieces of information, such as a boarding station, a boarding scheduled time, a boarding track number, a terminal station, and a starting station, to make an inquiry to the DNS (Domain Name System) server to acquire a corresponding IP address.

Further, the UE 10 may send the connection confirmation message to a representative server, not shown in the figures, without sending the connection confirmation message directly to the forwarding node 20 like (3) mentioned above so that the representative server will forward the connection confirmation message to an appropriate forwarding node 20. This enables the UE 10 to omit search processing for the forwarding node 20 and hence to reduce the processing load. Especially, when it is difficult to identify a train car to get on from now, the representative server can extract the address of the forwarding node 20 installed in a right train based on the inquired time, a position in which the UE 10 stays (position information of a GPS (Global Positioning System) may be acquired from the UE 10 through a connection confirmation message), or information on the base station 40 to which the UE 10 connects (the position of the UE 10 or the boarding station may be identified from cell information or base station information), information on the boarding track number, and the like, enabling reduction in the load on the UE 10 to perform inquiry processing. The information on the boarding station and the boarding track number, and information on the train scheduled to get on (train ID or the like) may be extracted based on information read from a medium (paper medium, magnetic medium, or electronic medium) such as a purchased thicket or a commuter pass. When the user of the UE 10 is already on a train, the train (the address of the forwarding node 20) may be identified (extracted or acquired) based on information such as the boarding time and the boarding station.

(4) Status Response: The forwarding node 20 receiving the connection confirmation message confirms the effectiveness of connecting to the forwarding node 20 after the UE 10 gets on the train based on the notified preference information (i.e., status confirmation processing on the storage server 30). In other words, it is confirmed:

whether a content desired by the UE 10 is already stored in the storage server 30, or whether the content can be acquired and stored from an external server (the confirmation of content consistency; for example, that the content is not permitted to acquire and store because of the author's right or copyright), or whether currently cached data in the storage server 30 is appropriate for the preference of the UE 10 (the confirmation of cache consistency; as to whether the cached data matches with at least data indicated in access history information notified through the preference information, or whether cached data on similar Web pages exceed a predetermined number).

Here, the forwarding node 20 may integrally make a determination based on a connection notification from any other UE (not shown in the figures) without making a determination when receiving a connection notification from the UE 10 to determine the advisability of connection of the UE 10. This is because it is assumed a case where connection confirmation from other UEs (not shown in the figures) occurs, for example, until the user of the UE 10 actually gets on the moving body, and preference information on the other UEs can be approximated to the preference information on the UE 10. In such a case, a connection acknowledgment response to be described later may be sent to the UE 10 when preference information enough to permit the connection of the UE 10 can be secured (i.e., a state capable of securing the reconfiguration of cache status or replenishing of contents to some extent). The transmission of the connection acknowledgment response may be delayed until the UE 10 gets on the moving body, or provided at any timing before boarding. Further, a connection acknowledgment response containing information for making the advisability of connection pending (or not containing the advisability of connection) may be sent immediately so that a formal connection acknowledgment response will be sent when the advisability is determined to update the UE 10. This enables the connection of the UE 10 to be determined by taking into consideration the cache status and content holding status changing during a period after the user of the UE 10 actually connects to the forwarding node 20 until the actual start of use of the service to increase the possibility that the user can use the service, improving user convenience and system efficiency.

Further, the forwarding node 20 may determine the advisability of connection of the UE 10 according to the load on the forwarding node 20 (the CPU load, the communication load on the WAN link or the LAN link, or the like), or the load on the storage server 30 (same as above). For example, when any of the above loads or a combination of plural pieces of load information exceeds a predetermined value, the connection of the UE 10 is refused.

Further, from the acquired preference information on the UE 10, when the forwarding node 20 detects that access to a network to which the forwarding node 20 cannot make access (a network the access of which is not permitted based on the contract or the like, such as a network for receiving a service provided to subscribers by an operator different from the operator used by the forwarding node 20) is needed, the forwarding node 20 may determine the advisability of connection by using only preference information that does not require such network access or according to the amount of preference information requiring such network access (note that the connection is not permitted when many pieces of preference information requiring such network access are included).

Further, when a station scheduled for the user of the UE 10 to get off (or drop-off scheduled position information) can be acquired in connection confirmation processing, a scheduled travel distance from the current station (or current position) or a scheduled travel time may be so calculated that, when the distance or the time is short, the connection to the forwarding node 20 will not be permitted. Here, the station scheduled to get off or the drop-off scheduled position information may be extracted based on information on a ticket or a train ticket held by the user of the UE 10 or a ticket or a train ticket stored in the UE 10. This can prevent processing for reconfiguring the cache status and acquiring content data for the UE 10 using the service for a short time to reduce the processing loads on the forwarding node 20 and the storage server 30. Further, the allocation of resources to processing for the UE 10 connecting for a longer time than the others can be improved, thereby improving the operational efficiency of the entire system.

Further, when the forwarding node 20 acquires information on the occurrence of an earthquake or a disaster or receives a predetermined instruction, the forwarding node 20 permits the connection of the UE 10 in a positive manner. In other words, even when the connection determination based on the preference information ends up with an undesirable result, the connection is permitted. This can lead to the accommodation of more UEs in the forwarding node to reduce the traffic of cellular accesses in order to avoid the congestion of the access network that can occur at the time of a disaster or the like, particularly improving the connectivity of emergency communication.

(5) Connection Acknowledgment Response: When both or either of the content consistency and the cache consistency agrees on the condition, the forwarding node 20 sends the UE 10 a connection acknowledgment response message for permitting the connection (including information indicative of the permission of connection) via the moving body-side base station 50, the gateway 60, and the WAN-side base station 40. The forwarding node 20 may assign a connection ID for identifying the UE 10 the connection of which is permitted to notify the UE 10 of the permission using the connection acknowledgment response message.

(6) Establishment of Communication Path: When the user of the UE 10 gets on a train in which the forwarding node 20 is installed to make the UE 10 connectable to the forwarding node 20, the UE 10 connects directly to the forwarding node 20 through a local wireless network (in addition to the wireless LAN, which may be, for example, Bluetooth (registered trademark), access via a non-contact IC, or millimeter-wave radio).

(7) Data Reconfiguration Instruction: At this time, the connection ID previously assigned is included in a message so that the forwarding node 20 can identify the UE 10 correctly and instruct the storage server 30 if needed to configure the cache status according to the preference of the UE 10 or replenish contents from an external server or the like. In configuring the cache status, for example, a search key or a search hash value is (totally or partially) reconfigured to improve search performance for an URL or cached data appropriate for the preference of the UE 10, data on associated Web sites are collected based on the Web access history acquired from the UE 10 and stored as cached data, or cache information acquired from the UE 10 is set in a database.

In (5) Connection Acknowledgment Response mentioned above, if both or either of the content consistency and the cache consistency does not agree on the condition, the forwarding node 20 will send the UE 10 a connection acknowledgment response message indicating that the connection is not permitted (including information indicative of the disapproval of connection). Upon receipt of this message, the UE 10 continues communication via the base station 40 even after getting on the train without connecting to the forwarding node 20. Here, the UE 10 receiving the connection acknowledgment response message including the information indicative of the disapproval of connection may create different preference information to confirm connection again. Further, the UE 10 may use the same preference information (or change preference information) to confirm connection to a different forwarding node in the same moving body or a forwarding node in a different moving body again. This can increase the chance of accommodating the UE 10 in the forwarding node 20 and hence improve communication efficiency in the entire system.

In (3) Connection Confirmation mentioned above, when the moving body 110 is made up of multiple train cars and the forwarding node 20 is installed in each car, connection confirmation is made to a forwarding node (referred to as 20*a*) as a representative of forwarding nodes. The representative forwarding node 20*a* performing connection confirmation processing confirms, between the forwarding nodes 20*a* and 20, the cache status and content holding status in another forwarding node 20 on the moving body 110 (via a WAN line or via a local line in the moving body 110) to make a connection determination on the UE 10. This enables the UE 10 to avoid making connection confirmation to each of the multiple forwarding nodes 20 in the same moving body 110 individually in order to reduce the processing time and hence improve user convenience.

Further, in (5) Connection Acknowledgment Response mentioned above, the connection ID to be assigned is made unique in the moving body 110 so that even when the UE 10 accesses any forwarding node 20 in the moving body 110 later, cached data or a content appropriate for the preference of the UE 10 can be identified by the connection ID and shared among the forwarding nodes 20. This can make the system resources useful even when each of the forwarding nodes 20 performs cache and content storage individually, and hence improve the user convenience of the local connection service. Further, the car number with the highest effectiveness of use of the cache/content when the UE 10 goes on board or car numbers listed in descending order of effectiveness may be notified through a connection acknowledgment response message for the purpose of reducing the system load due to sharing of cached data or contents among the forwarding nodes 20 so that the user will decide on a car the user is going to get on based on the acquired car number or the like to make boarding more effective (i.e., the effectiveness of connecting to a forwarding node 20).

Further, in (5) Connection Acknowledgment Response mentioned above, in the connection acknowledgment response message indicative of the permission of connection, the forwarding node 20 may include a list of stored contents or categories, the determination results of the content consistency and the cache consistency (information indicative of approval/disapproval (bit values or the like) or numeric values indicative of consistencies), or information (addresses such as URLs or categories of Web pages) on cached Web pages. This allows the UE 10 to determine the connection to the forwarding node 20 after boarding according to the state of the storage server 30 in order to decide whether to connect based on user's intention.

Further, in deriving the address of the forwarding node 20 mentioned above, when two or more addresses are obtained, the UE 10 performs connection confirmation processing at (3) mentioned above on each of the forwarding nodes 20 to manage and hold the acquired connection IDs for each of the forwarding nodes 20. This is a situation when the UE 10 can acquire only station information or cannot identify even station information (i.e., it can acquire only position information). In this case, the address of a forwarding node 20 installed in a train possibly to get on at the time is derived from the identified station or position.

In (6) Establishment of Communication Path mentioned above, the UE 10 uses a connection ID acquired from a corresponding forwarding node 20 to establish a connection when getting on a train. The forwarding node 20 to which the UE 10 established the connection establishes an environment suitable for the UE 10 if needed (the details are as mentioned above). Here, at the point of deciding on a forwarding node 20 to which a connection is established, processing for releasing the context (connection ID, holding of preference information on the UE 10, and the like) as a result of connection confirmation processing previously performed on any other forwarding node 20 may be performed (i.e., sending a request message and receiving a response message indicative of completion of release at the forwarding node). In addition, information (on the forwarding nodes 20 to which no connection was established this time) held by the UE 10 may also be released. This can reduce the consumption of resources on the UE 10 and the forwarding node 20.

Here, when the UE 10 has a communication session before connecting to the forwarding node 20 (especially when communication in the session is ongoing), the UE 10 may perform handover to an untrusted Non-3GPP access network as disclosed in TS23.402 after connecting to the forwarding node 20. In other words, a connection process including information indicative of handover to a packet gateway ePDG (enhanced Packet Data Gateway) (or a PDG (Packet Data Gateway) as disclosed in TS23.234) installed in the core network is sent to hand over the session connection established via the WAN to a connection via a wireless LAN service provided by the forwarding node 20. The handover procedure is disclosed in TS23.402 as mentioned above. However, in carrying out the present invention, when the presence of a communication session ongoing on the WAN connection is detected upon completion of the connection to the forwarding node 20, a handover triggering unit for stating the above handover procedure is required.

When the UE 10 has started connection processing for a forwarding node (tentatively called a forwarding node 2) different from a forwarding node (tentatively called a forwarding node 1) to which the connection confirmation was made, the following processing may be performed; For example, an address or an identifier for allowing the forwarding node 2 to connect to the forwarding node 1 is acquired (i.e., the address or the identifier of the forwarding node 1 when connection confirmation from the UE 10 was made is acquired, or a moving body possibly to get on and the address or the identifier of the forwarding node 1 are extracted from boarding scheduled information, such as a ticket or a commuter pass of the user of the UE 10, position information when the connection confirmation was made, platform information, and the like) to connect to the forwarding node 1 in order to acquire, from the forwarding node 1, preference information on the UE 10 and connection advisability information, and further configuration information for the UE 10 (information on the settings of the forwarding node and the storage server when the UE 10 establishes a connection, information on a cache already downloaded or reconfigured, and the like). Then, based on the acquired configuration information, the forwarding node 2 configures, for the UE 10, the settings of the forwarding node 2 and a storage server to connect.

Further, when the UE 10 gets on a moving body different from a moving body in which such a forwarding node that has already made connection confirmation is installed, or when the UE 10 cannot find a forwarding node (forwarding node 1) that made the connection confirmation after the UE 10 got on a moving body, the UE 10 performs connection confirmation processing again to connect to a forwarding node (forwarding node 2) installed in the moving body the user got on. At this time, the above information on the UE 10 may be forwarded between the forwarding node 1 and the forwarding node 2. Further, the information may be forwarded between the forwarding node 1 and the forwarding node 2 in the process of connection processing performed by the UE 10 on the forwarding node 2, or when the UE 10 connects to the forwarding node 2. In other words, the UE 10 sends the forwarding node 2 a connection confirmation request including the address or the identifier of the forwarding node 1 that previously made the connection confirmation. The forwarding node 2 acquires configuration information on the UE 10 from the forwarding node 1, and based on preference information on the UE 10 acquired from the acquired configuration information on the UE 10 and the connection confirmation request, the forwarding node 2 performs status response processing. Alternatively, as mentioned above, information on the UE 10 is forwarded when the UE 10 connects to the forwarding node 2.

In the above description, the operation when the user gets on a train is taken as an example of the moving body 110 in which a local wireless connection service is provided by the forwarding node 20, but the moving body may be other than the train, i.e., a bus, a taxi, a private car, an airplane, a ship, a theme-park ride (Ferris wheel or the like), a gondola, a monorail, a cable car, or a horse-drawn carriage. Further, it may be an object accompanied by movement relative to the moving UE 10, such as a wireless connection service provided, for example, at a cafe or a restaurant.

<Structure of Forwarding Node>

Next, the structure of the forwarding node 20 according to the present invention will be described with reference to FIG. 3. The forwarding node 20 is made up of a LAN communication unit 21 for communicating with the UE 10 (and the UE 70; the same shall apply hereinafter) in the moving body 110 through a local wireless network, a WAN communication unit 23 for performing cellular communication through the base station 50, a forwarding unit 22 for relaying data traffic flowing through the LAN communication unit 21 and the WAN communication unit 23, a server I/F unit 24 connecting with the storage server 30 to cache the relayed traffic, and a connection acknowledgment unit 25 for acknowledging the connection by the UE 10.

Data traffic of the UE 70 received by the LAN communication unit 21 to connect to a local communication service (hereinafter called upstream traffic) is forwarded to the base station 50 through the forwarding unit 22 and the WAN communication unit 23. Further, data traffic received by the WAN communication unit 23 from the base station 50 (hereinafter called downstream traffic) is forwarded to the UE 10 under control through the forwarding unit 22 and The LAN communication unit 21. Before forwarding data traffic, the forwarding unit 22 forwards the data traffic to the storage server 30 through the server I/F unit 24 to perform cache processing in the storage server 30 (hereinafter, which may also be called proxy processing). In other words, the storage server 30 stores association between upstream traffic and downstream traffic as cached data.

Thus, when the forwarding unit 22 makes a cache request to the storage server 30 for upstream traffic via the server I/F 24 unit, cached data of upstream traffic stored in the storage server 30 is searched for, and when the cached data is hit, cached data of corresponding downstream traffic is forwarded to the forwarding unit 22 via the server I/F unit. At this time, downstream traffic (header, data format, and the like) can be newly generated or generated based on information stored in a cache database. The forwarding unit 22 sends the corresponding UE 10 the downstream traffic acquired from the storage server 30 via the LAN communication unit 21 without forwarding upstream traffic being processed to the WAN communication unit 23. Further, when content data requested by the upstream traffic is already stored in the storage server 30, downstream traffic for delivering the content to the UE 10 is generated in the same manner and sent to the UE 10 via the LAN communication unit 21. The downstream traffic, i.e., an upper layer header such as an IP or UDP/TCP/HTTP (User Datagram Protocol/Transmission Control Protocol/Hyper Text Transfer Protocol) and a payload may be generated by the storage server 30 or by the forwarding unit 22.

<Processing at Forwarding Node>

Figure 4:
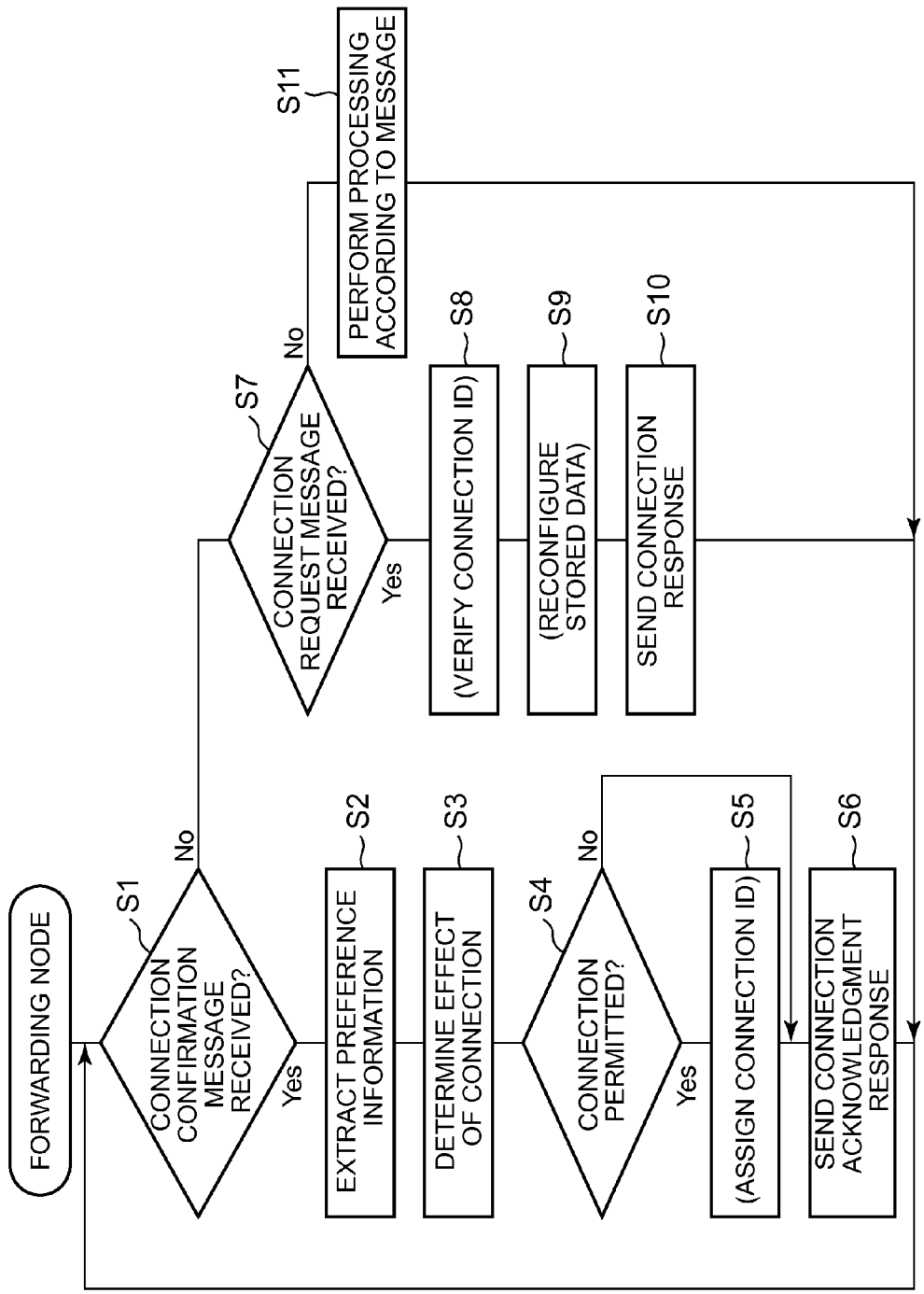
FIG. 4 is a flowchart for describing the operation of the forwarding node shown in FIG. 1 and FIG. 3.

The operation of the forwarding node 20 structured as mentioned above and regarding the connection confirmation and connection processing will be described with reference to FIG. 4. When the WAN communication unit 23 receives a connection confirmation message from the UE 10 (Yes in step S1), the message is forwarded to the connection acknowledgment unit 25, and the connection acknowledgment unit 25 acquires preference information from the connection confirmation message (step S2). Based on the acquired preference information on the UE 10, the connection acknowledgment unit 25 makes an inquiry through the server I/F unit 24 about the suitability for a cache database or a content database held by the storage server 30. As a result, when the suitability acquired from the storage server 30 exceeds a predetermined value, it is determined that the effectiveness of the connection of the UE 10 to the forwarding node 20 is high, and hence the connection acknowledgment unit 25 determines to permit the connection of the UE 10 (step S3). When the connection is permitted (Yes in step S4), a connection ID that can uniquely identify the UE 10 is assigned if needed (step S5). The assigned connection ID is managed for a predetermined period in association with the acquired preference information. The predetermined period is, for example, a period until the UE 10 actually establishes the connection, a period from the actual connection until disconnection (disconnection because the user gets off), or any other period (for example, one hour).

When part of information (content) preferred by the UE 10 the connection of which is permitted is not stored in the storage server 30, the information may be acquired in advance and prepared for the connection of the UE 10. In this case, the connection acknowledgment unit 25 sends, through the WAN communication unit 23, a request message for acquiring the content preferred by the UE 10 but not stored in the storage server 30, and stores the content acquired as a result in the storage server 30 through the server I/F unit 24. Thus, an environment appropriate for the user can be provided before the UE 10 uses the local connection service, improving user convenience. Here, such an operation may be managed in association with the connection ID previously assigned. This can lead to performing a billing process to charge for an additional service to enhance the customer value on a user-by-user basis.

Then, the connection acknowledgment unit 25 sends the UE 10 a connection acknowledgment response message (step S6). The connection acknowledgment response message includes information indicative of the advisability of connection (approval or disapproval of connection), and further a connection ID when the connection is permitted and the connection ID is assigned.

When the UE 10 gets on the train concerned, the LAN communication unit 21 receives a connection request message from the UE 10 (Yes in step S7). The LAN communication unit 21 forwards the connection request message to the connection acknowledgment unit 25, and the connection acknowledgment unit 25 acquires a connection ID if included in the message to verify whether the connection ID is assigned by itself (step S8). When the acquired connection ID is correct, data stored in the storage server 30 is reconfigured if needed so that the preference of the UE 10 can be more reflected (step S9). In step S9, for example, when a content preferred by the user of the UE 10 is not stored, the connection acknowledgment unit 25 sends a request message through the WAN communication unit 23 to acquire the content preferred by the UE 10 but not stored in the storage server 30, and stores the content acquired as a result in the storage server 30 through the server I/F unit 24. This can lead to avoiding replenishing of contents unnecessary for the UE 10 that did not actually establish any connection, compared with a case where contents are replenished in advance, thereby making effective use of resources on the forwarding node 20. Here, such an operation may be managed in association with the connection ID previously assigned. This can lead to performing a billing process to charge for an additional service to enhance the customer value on a user-by-user basis.

Upon completion of necessary connection processing in the connection acknowledgment unit 25 and the LAN communication unit 21, the LAN communication unit 21 sends a connection response message to the UE 10 to complete the connection processing for the UE 10 (step S10). When the LAN communication unit 21 or the WAN communication unit 23 of the forwarding node 20 receives any message other than that mentioned above (No in step S7), a procedure separately defined is performed (processing according to the message is performed in step S11).

<Structure of Mobile Terminal>

Next, the structure of the UE 10 as a mobile terminal according to the present invention will be described with reference to FIG. 5. The UE 10 is made up of a LAN communication unit 11 for communicating with the forwarding node 20 in the moving body 110 through a local wireless network, a WAN communication unit 13 for performing cellular communication through the base station 40, a communication control unit 12 for performing communication control on the LAN communication unit 11 and the WAN communication unit 13 such as to manage connections, a network (NW) processing unit 14 for performing communication (particularly IP communication) through the LAN communication unit 11 or the WAN communication unit 13, an application unit 15 for running an application using a communication function, and a connection confirmation unit 16 for performing connection confirmation processing on the forwarding node 20.

<Processing at Mobile Terminal>

Figure 6:
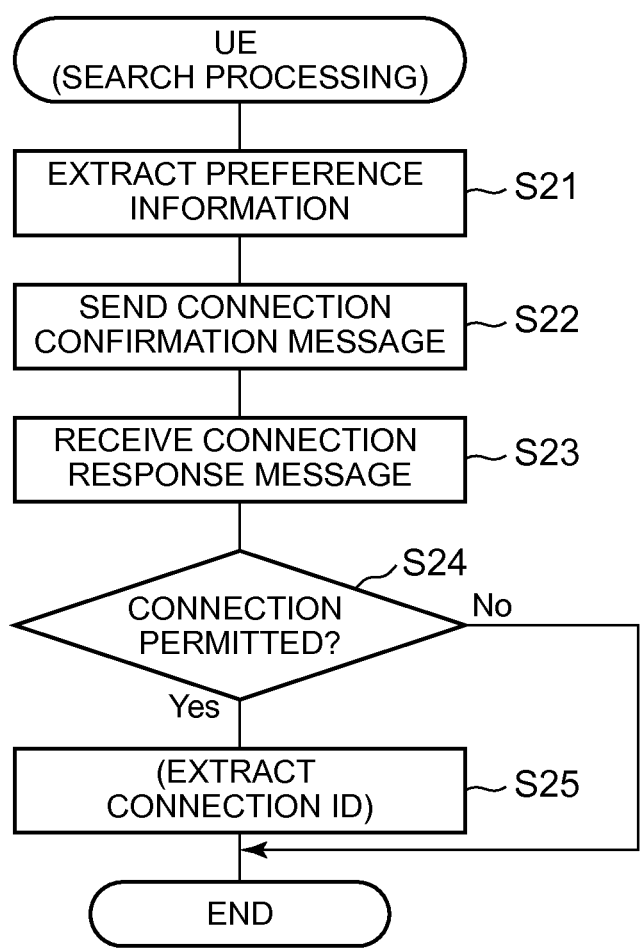
FIG. 6 is a flowchart for describing search processing at the UE shown in FIG. 1 and FIG. 5.

The operation of the UE 10 structured as mentioned above and regarding search processing will be described with reference to FIG. 6. When the user instructs the UE 10 to search for information on a local connection service provided in a train scheduled to get on (or the user is already on the train), the connection confirmation unit 16 extracts user preference information (step S21).

This is information capable of extracting information that the user possibly accesses through the Internet like a past communication history (cached data such as a URL as a destination of Web access), information on hobbies (hobby fields; movie-going (and further a favorite genre, such as Japanese movie, foreign movie, or action), music appreciation (and a genre such as lock or classic by the same token), cooking, reading, and watching baseball), a favorite TV show (such as a sports event like a baseball game or a news show), information on a newspaper or a magazine the user subscribes to, and the like. As for the past communication history, for example, a communication history of using the local wireless service in a train in the past may be used. Thus, user preference based particularly on behavior in the train can be extracted, making the effectiveness of use of a service to be described later and system efficiency higher. Further, the preference information may be extracted before the user gives an instruction to search for information on the local connection service (i.e., in advance).

Then, the connection confirmation unit 16 sends a connection confirmation message including the extracted preference information to the forwarding node 20 through the WAN communication unit 13 (step S22). Prior to this, the connection confirmation unit 16 derives the address (IP address) of the forwarding node 20 by the procedure mentioned above. When receiving a connection response message, the WAN communication unit 13 forwards the connection response message to the connection confirmation unit 16 (step S23), and the connection confirmation unit 16 confirms the advisability of connection (step S24). When a connection ID is included in a connection response message indicating that the connection is permitted (Yes in step S24), the connection ID is extracted and stored (step S25).

Further, when information necessary for connection to the forwarding node 20 (e.g., frequency information on an access point or master key information such as SSID (Service Set IDentification), WEP (Wired Equivalent Privacy), or WPA (Wi-Fi Protected Access) in the case of WiFi (registered trademark), or an access point name and path code for pairing in the case of Bluetooth (registered trademark)) is included in the connection response message, they are extracted and stored. For example, this can be set as the configuration of the LAN communication unit 11 so that the UE 10 can automatically detect an access point to establish a connection after that.

Here, in step S24, when a list of contents or categories held by the forwarding node 20, the determination results of the content consistency and the cache consistency (which may be information indicative of approval/disapproval (bit values or the like) or numeric values indicative of consistencies), or information (addresses such as URLs or categories of Web pages) on cached Web pages can be acquired from a connection acknowledgment response message indicative of the permission of connection, the connection confirmation unit 16 may compare the information with the own preference information to determine whether to connect to the forwarding node 20 after the user gets on. Thus, since whether to perform connection establishment is decided based on user's intention is made, such a situation that "there is no desired information even after establishing the connection" can be avoided, preventing inefficient connection and hence improving user convenience. When a connection acknowledgment response message indicating that the connection is not permitted (No in step S24), the UE 10 continues communication via the WAN-side base station 40 even after getting on the train without connecting to the forwarding node 20. In other words, connection processing to be described below is not performed.

Figure 7:
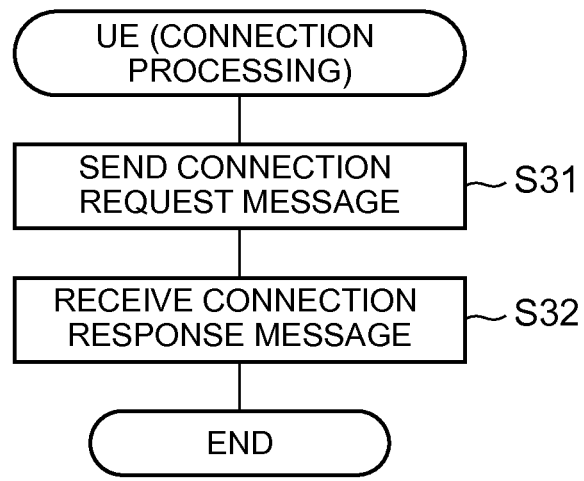
FIG. 7 is a flowchart for describing connection processing at the UE shown in FIG. 1 and FIG. 5.

Referring next to FIG. 7, the operation of the UE 10 regarding the connection processing will be described. The LAN communication unit 11 uses information (information on the frequency of an access point or SSID) for accessing a local connection service previously acquired through the connection acknowledgment response message or by a different unit to find a forwarding node and send a connection request message (step S31). At this time, when a connection ID is acquired in advance, the connection ID is included in the connection request message and sent. When receiving a connection response message after the forwarding node 20 performs connection processing correctly, the connection processing is completed (step S32). In response to this, network access via the local connection service is started by means of the forwarding node 20.

Second Embodiment

A second embodiment is different from the first embodiment in that a target to be inquired by the UE 10 is a server for providing information on a neighboring access network, rather than the forwarding node 20. In other words, the inquiry from the UE 10 is made about connectivity to both a mobile-type local wireless service provided in a moving body 110 and a conventional fixed-type local wireless service. In response to the inquiry, the mobile-type and fixed-type local wireless services to which the UE 10 can connect at a position where the inquiry is made are provided in an integrated fashion. This eliminates the need to make inquiries about information on fixed-type and mobile-type services separately, enabling the inquiries by the same procedure and hence reduction in the burden of the user.

<System Configuration>

Figure 8:
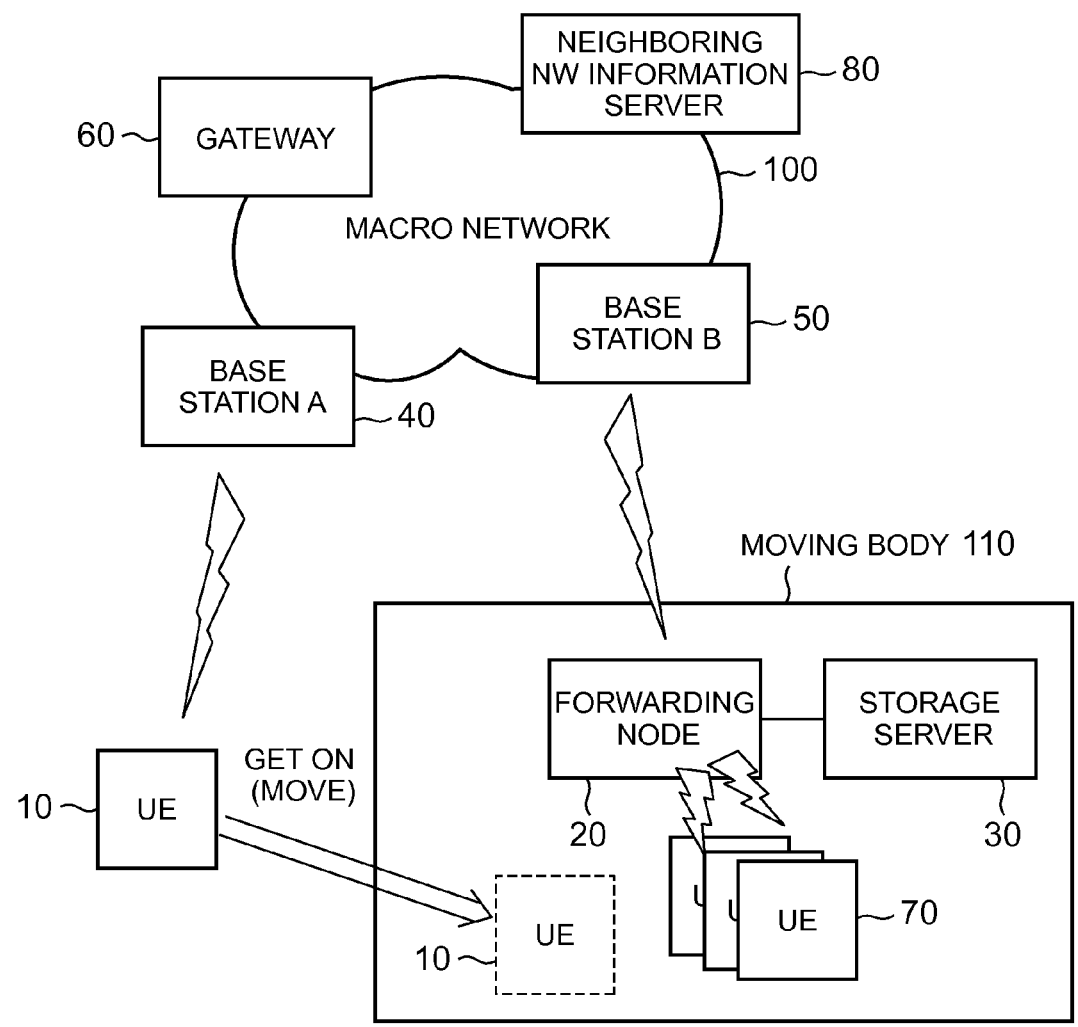
FIG. 8 is a diagram showing a system configuration according to a second embodiment of the present invention.

FIG. 8 is a diagram showing a system configuration according to the second embodiment of the present invention. In FIG. 8, a neighboring network (NW) information server 80 is added in addition to the entities shown in FIG. 1. The neighboring NW information server 80 delivers, to the UE 10, information on an access network existing in the neighborhood of the UE 10 and connectable by the UE 10. The neighboring NW information server 80 may be, for example, an ANDSF (Access Network Discovery and Selection Function) server described in 3GPP TS23.402. Since the entities other than the neighboring NW information server 80 (excluding the UE 10) are the same as those in the first embodiment, the detailed description will be omitted. Like in FIG. 1, for the sake of simplifying the description, the UE 10 and the forwarding node 20 are accommodated in the same gateway 60 in FIG. 8, but they may be connected to different gateways, respectively.

<System Operation>

Figure 9:
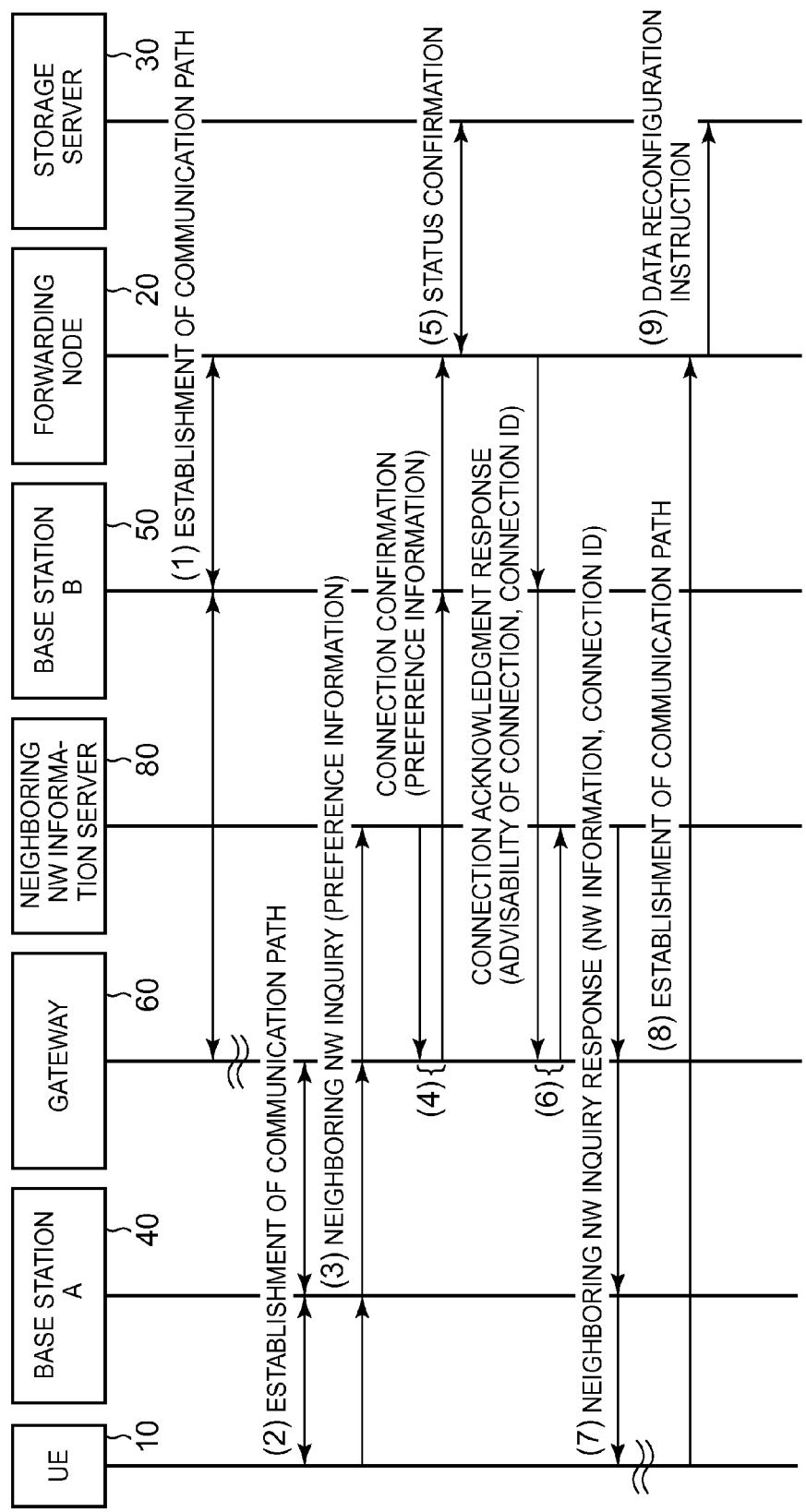
FIG. 9 is a communication sequence chart for describing the operation of the system of FIG. 8.

The operation of a system having the above configuration will be described with reference to FIG. 9.

(1) Establishment of Communication Path: First, the forwarding node 20 establishes a communication path with the gateway 60 via the WAN-side base station 50. Here, for example, the communication path is a communication connection in a cellular system, such as UMTS, GPRS, LTE, or SAE, which is also called a PDP context, a PDN connection, or an SAE bearer depending on the system. Further, the establishment of the communication connection is any one of an Attach procedure, an Activate PDP Context procedure, a Service Request procedure, and a Handover procedure provided in 3GPP TS23.060, and an Attach procedure, a Service Request procedure, and a Handover procedure provided in 3GPP TS23.401 or 3GPP TS23.402. By establishing a communication connection, an IP (Internet Protocol) address is allocated (or reassigned upon handover) to the forwarding node 20 from the gateway 60, enabling communication with an external node, not shown in the figures.

(2) Establishment of Communication Path: Further, the UE 10 also establishes a communication path with the gateway 60 through the WAN-side base station 40. This also leads to issuing an IP address to the UE 10 from the gateway 60, enabling communication with an external node, not shown in the figures. Note that the timing of establishing the communication path by the forwarding node 20 does not need to be synchronized with the timing of establishing the communication path by the UE 10.

(3) Neighboring NW Inquiry: After completion of the establishment of the communication paths at (1) and (2) as mentioned above, the UE 10 sends a neighboring NW inquiry message at any timing to the neighboring NW information server 80 through the WAN-side base station 40 and the gateway 60 to make an inquiry about information on an access network existing in the neighborhood and connectable by the UE 10. Like in the first embodiment, a scenario is assumed here, in which the user holding the UE 10 is waiting on a platform for a train scheduled to get on. The UE 10 sends the neighboring NW inquiry message with preference information on the UE 10 (user) included therein. The preference information is the same as that described in the first embodiment.

(4) Connection Confirmation: Based on position information on the UE 10 and the like acquired from the UE 10 or the cellular system, the neighboring NW information server 80 identifies a station where the user (the UE 10) is waiting. Further, based on the time of acquiring the message, it identifies a train possible for the user to get on. The neighboring NW information server 80 may acquire station information from the UE 10 to identify the boarding station. This can reduce the processing load for identifying a station from map data based on the position information on the UE 10. Further, the neighboring NW information server 80 may acquire, from the UE 10, information on the train scheduled to get on. This can reduce the processing load for identifying a train scheduled to get on from station information or time information. The information on the boarding station and the boarding track number, and information on the train scheduled to get on (train ID or the like) may be extracted by using information read from a medium (paper medium, magnetic medium, or electronic medium), such as a purchased thicket or a commuter pass, extracted from the UE 10.

When identifying a train scheduled for the user to get on, the neighboring NW information server 80 derives the address of a forwarding node 20 installed in the identified train by a method as mentioned above, and sends a connection confirmation message including the preference information acquired from the UE 10 to the forwarding node 20 via the gateway 60 and the LAN-side base station 50. The UE 10 sends the neighboring NW information server 80 plural pieces of position information measured every predetermined unit time (e.g., every second) so that the neighboring NW information server 80 can detect mobility (speed, direction, and the like) of the user (the UE 10) to identify a train the UE 10 is already thereon as a result of checking it against the time table or map data. In this case, the connection confirmation message is sent to the forwarding node 20 installed in the identified train.

(5) Status Confirmation: The forwarding node 20 receiving the connection confirmation message confirms the effectiveness/ineffectiveness of connecting to the forwarding node 20 after the UE 10 gets on the train based on the notified preference information by a method as shown in the first embodiment (i.e., status confirmation processing on the storage server 30).

(6) Connection Acknowledgment Response: When both or either of the content consistency and the cache consistency agrees on the condition, the forwarding node 20 sends the neighboring NW information server 80 a connection acknowledgment response message for permitting the UE 10 to establish a connection (including information indicative of the permission of connection). The forwarding node 20 may assign and forward a connection ID for identifying the UE 10 the connection of which is permitted by using the connection acknowledgment response message.

(7) Neighboring NW Inquiry Response: Only when the connection is permitted by the forwarding node 20, the neighboring NW information server 80 sends the UE 10 a neighboring NW response message including information for connecting to the forwarding node 20, such as information on the frequency or SSID and a connection ID (when notified from the forwarding node 20). When the connection of the UE 10 is not permitted, the neighboring NW information server 80 sends the UE 10 a neighboring NW response message without including information for connecting to the forwarding node 20. The fact that the connection is not permitted is equivalent to that the information on the forwarding node 20 is information unnecessary for the UE 10. Such unnecessary information is hidden (i.e., the information is not sent to the UE 10) to enable effective use of network resources and reduction in the processing loads on the UE 10 and the neighboring NW information server 80.

(8) Establishment of Communication Path: When the UE 10 can acquire the information for connecting to the forwarding node 20, the UE 10 connects directly to the forwarding node 20 after that through a local wireless network (in addition to the wireless LAN, which may be, for example, Bluetooth (registered trademark), access via a non-contact IC, or millimeter-wave radio) when the UE 10 gets on the train in which the forwarding node 20 is installed.

(9) Data Reconfiguration Instruction: At this time, the connection ID previously assigned is included in a message so that the forwarding node 20 can identify the UE 10 correctly and instruct the storage server 30 if needed to configure the cache status according to the preference of the UE 10 or replenish contents from an external server or the like. In configuring the cache status, for example, a search key or a search hash value is (totally or partially) reconfigured to improve search performance for an URL or cached data appropriate for the preference of the UE 10, data on associated Web sites are collected based on the Web access history acquired from the UE 10 and stored as cached data, or cache information acquired from the UE 10 is set in a database. When the UE 10 can acquire the information for connecting to the forwarding node 20, the UE 10 continues communication via the WAN-side base station 40 after that without connecting to the local wireless service provided by the forwarding node 20 even if the UE 10 gets on the train in which the forwarding node 20 is installed.

Note that the neighboring NW information server 80 can provide, to the UE 10, a mixture of information on a fixed-type local connection service provided by a conventional access point installed in a specific position (i.e., information for detecting an access point to connect thereto, such as frequency information or SSID) and information on a mobile-type local connection service provided by the forwarding node 20 moving together with the moving body 110 as mentioned above. In this case, information such as a flag particularly indicative of the mobile type is added to the information on the mobile-type local connection service so that a difference from the local connection service by the UE 10 can be recognized. Further, a scheduled time of the mobile-type local connection service arriving at or passing through the current position of the UE 10 (or a relative time from the present moment) may be notified together to enable the UE 10 to control the timing of accessing the mobile-type local connection service, thereby avoiding unnecessarily repeated access trials before the local connection service (i.e., the forwarding node 20) arrives, and hence reducing the battery consumption of the UE 10.

<Structure of Mobile Terminal>

Figure 10:
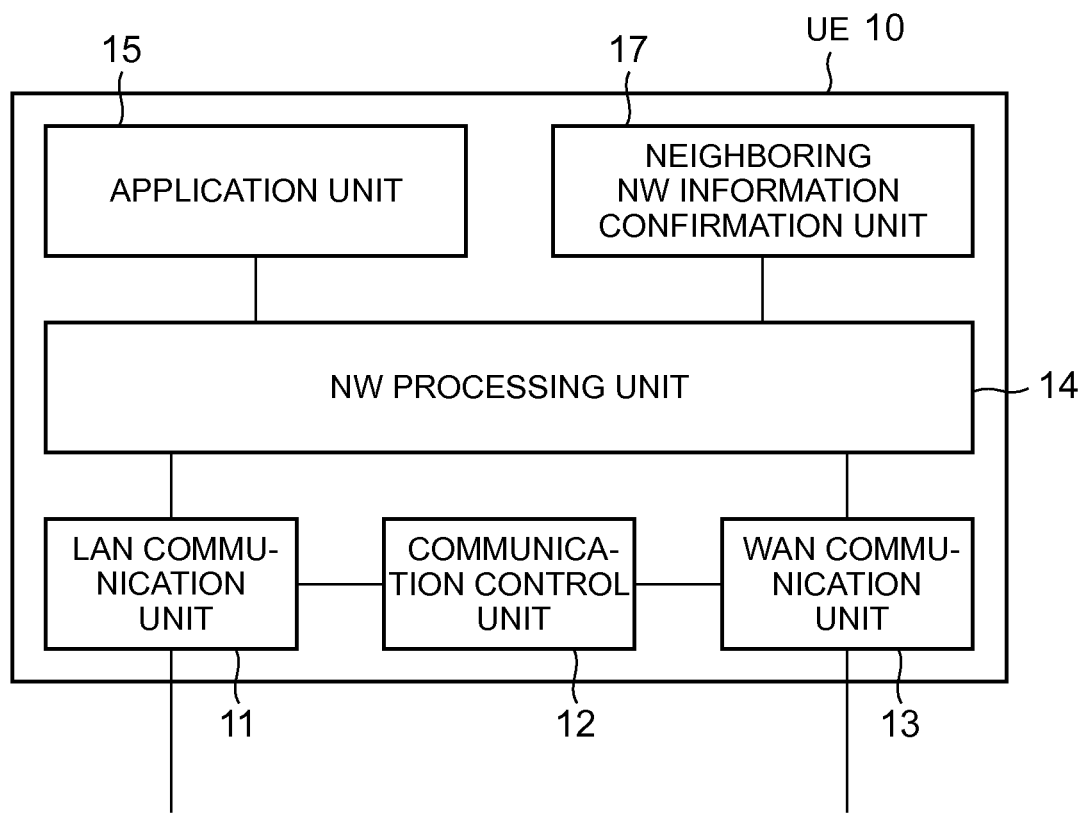
FIG. 10 is a block diagram showing a UE of FIG. 8 in detail.

Next, the structure of the UE 10 according to the second embodiment will be described with reference to FIG. 10. In FIG. 10, a neighboring NW information confirmation unit 17 is provided instead of the connection confirmation unit 16 shown in FIG. 5. Since the other units are the same, the description will be omitted. The neighboring NW information confirmation unit 17 acquires information on an access network in the neighborhood of the neighboring NW information server 80 or connectable by the UE 10.

<Processing at Mobile Terminal>

Figure 11:
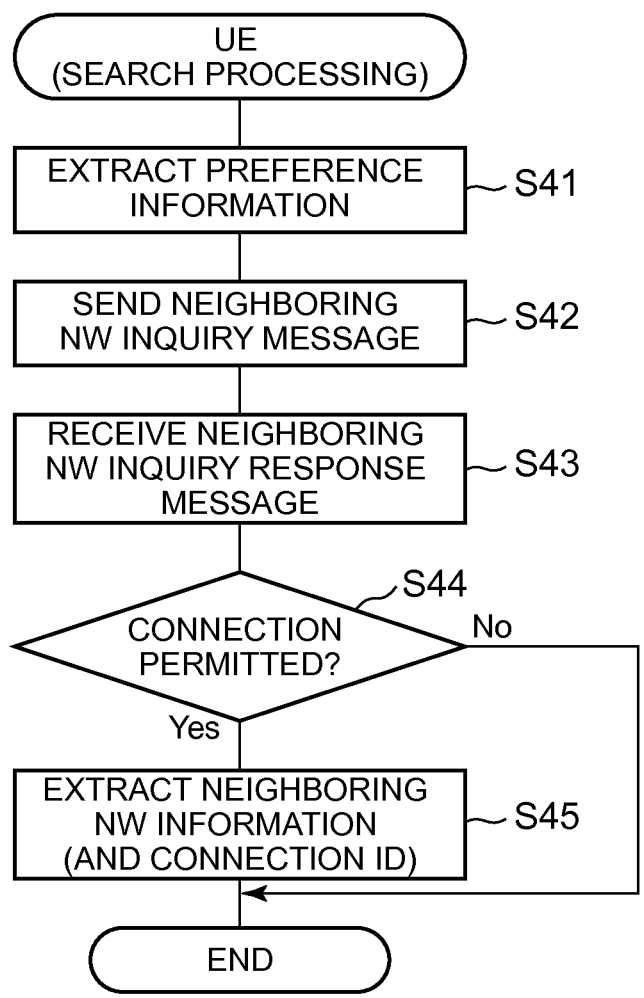
FIG. 11 is a flowchart for describing search processing at the UE shown in FIG. 8 and FIG. 10.

The operation of the UE 10 structured as mentioned above and regarding search processing will be described with reference to FIG. 11. When the user instructs the UE 10 to search for information on a local connection service set up in the neighborhood of the UE 10 or provided in a train scheduled to get on (or the user is already thereon), the neighboring NW information confirmation unit 17 extracts preference information on the user (step S41). This is information capable of extracting information that the user possibly accesses through the Internet like a past communication history (cached data such as a URL as a destination of Web access), information on hobbies (hobby fields; movie-going (and further a favorite genre, such as Japanese movie, foreign movie, or action), music appreciation (and a genre such as lock or classic by the same token), cooking, reading, and watching baseball), a favorite TV show (such as a sports event like a baseball game or a news show), information on a newspaper or a magazine the user subscribes to, and the like. Note that the preference information may be extracted before the user gives an instruction to search for information on the local connection service (i.e., in advance).

Then, the neighboring NW information confirmation unit 17 sends a neighboring NW inquiry message including the extracted preference information to the neighboring NW information server 80 through the WAN communication unit 13 (step S42). When receiving a neighboring NW inquiry response message, the WAN communication unit 13 forwards it to the neighboring NW information confirmation unit 17 (step S43), and when neighboring NW information for connecting to the access point (i.e., the forwarding node 20) existing in the neighborhood is included in the neighboring NW inquiry response message (the permission of connection is Yes in step S44), the neighboring NW information confirmation unit 17 extracts neighboring NW information (and a connection ID) to be extracted (step S45). For example, this corresponds to frequency information on the access point or master key information such as SSID, WEP, or WPA when the access point provides a service using WiFi (registered trademark), or the access point name and path code for pairing when the access point provides a service by Bluetooth (registered trademark). Here, when a connection ID is included in the neighboring NW inquiry response message, the connection ID is extracted and stored together with the neighboring NW information. When the neighboring NW information is not included in the neighboring NW inquiry response message (permission of connection is No in step S44), the search processing is ended directly.

Here, when a list of contents or categories held by the forwarding node 20, the determination results of the content consistency and the cache consistency (which may be information indicative of approval/disapproval (bit values or the like) or numeric values indicative of consistencies), or information (addresses such as URLs or categories of Web pages) on cached Web pages can be acquired from the neighboring NW information, these pieces of information may be compared with own preference information so that the neighboring NW information confirmation unit 17 will determine whether to connect the connection to the forwarding node 20 is to be established after the user gets on. Thus, since whether to perform connection establishment is decided based on user's intention, such a situation that "there is no desired information even after establishing the connection" can be avoided and user convenience will be improved. Since the subsequent connection processing performed by the UE 10 is the same as that described in the first embodiment with reference to FIG. 7, redundant description will be omitted here.

<Structure of Neighboring NW Information Server>

Figure 12:
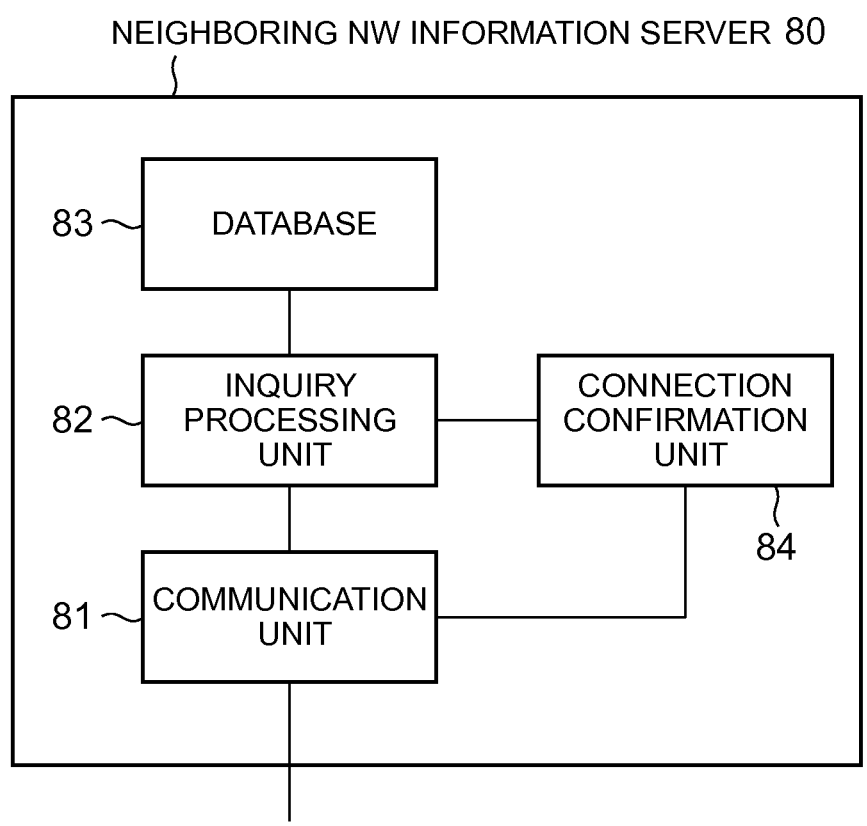
FIG. 12 is a block diagram showing a neighboring network information server of FIG. 8 in detail.

Next, the structure of the neighboring NW information server according to the present invention will be described with reference to FIG. 12. The neighboring NW information server 80 is, for example, made up of a communication unit 81 for performing IP communication, an inquiry processing unit 82 for processing an inquiry from the UE 10 about neighboring NW information, a database 83 for storing neighboring NW information, and a connection confirmation unit 84 for performing processing for confirming the connectivity of the UE 10 to a local connection service set up in a moving body 110 according to the present invention. Note that the database 83 may also be implemented in a device logically or physically different from the neighboring NW information server 80.

<Processing at Neighboring NW Information Server>

Figure 13:
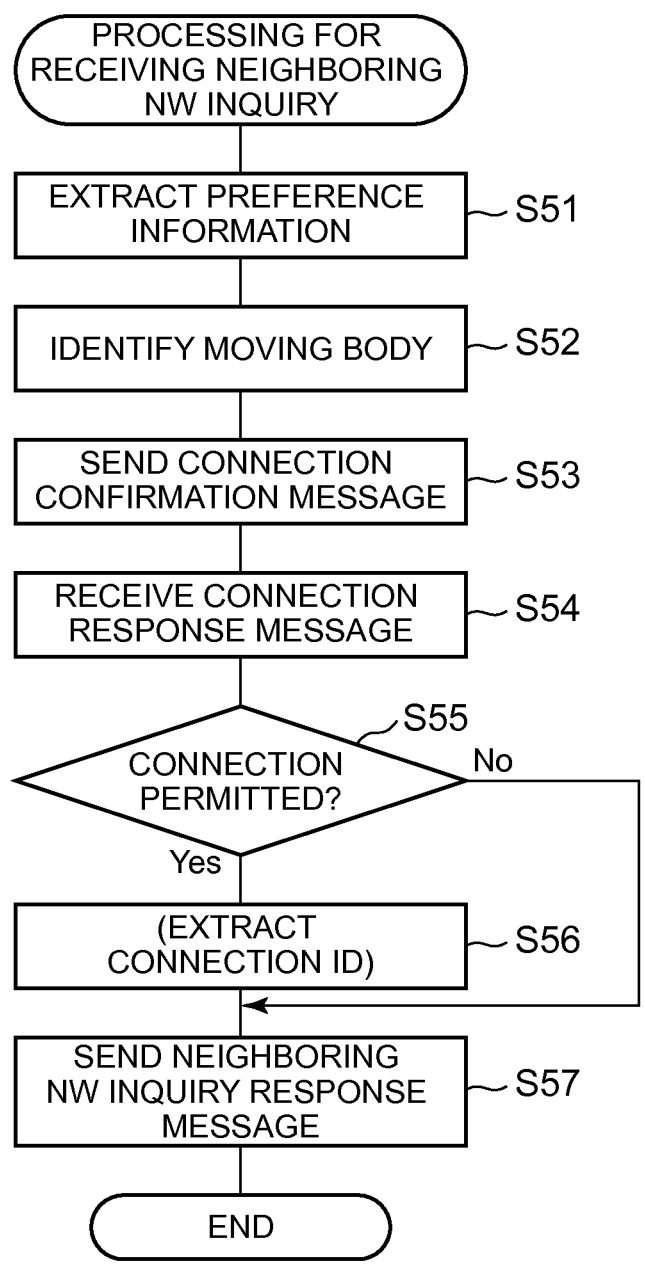
FIG. 13 is a flowchart for describing processing at the neighboring network information server shown in FIG. 8 and FIG. 12.

The operation of the neighboring NW information server structured as mentioned above and regarding the neighboring NW inquiry processing will be described with reference to FIG. 13. When receiving a neighboring NW inquiry message from the UE 10, the communication unit 81 forwards it to the inquiry processing unit 82. Further, the inquiry processing unit 82 requests the connection confirmation unit 84 to perform connection confirmation processing to acquire information on a mobile-type local connection service provided by a forwarding node 20 moving together with a moving body 110. At this time, the inquiry processing unit 82 may forward, to the connection confirmation unit 84, associated information (such as position information and preference information on the UE 10) included in the neighboring NW inquiry message. The inquiry processing unit 82 may also forward the neighboring NW inquiry message itself (or a payload with a header removed). When corresponding information is already stored in a database, the information may be included in the neighboring NW inquiry response message and sent back to the UE 10 to end the processing.

The connection confirmation unit 84 extracts the preference information on the UE 10 (step S51) to identify a train (moving body 110) the UE 10 is scheduled to get on or possibly to get on, and derive the address of a forwarding node 20 installed in the moving body 110 (step S52: Identify Moving Body). Note that the moving body is identified by the same method as described in the first embodiment. The connection confirmation unit 84 sends a connection confirmation message including the preference information on the UE 10 to the forwarding node 20 through the communication unit 81 (step S53). When receiving a corresponding connection response message from the forwarding node 20 via the communication unit 81 (step S54), the connection confirmation unit 84 confirms the advisability of connection included in the corresponding message (step S55). When the response indicates the permission of connection (Yes in step S55), a connection ID is further extracted if included in the response message (step S56).

The connection confirmation unit 84 notifies the inquiry processing unit 82 of the above information acquired from the forwarding node 20 as information on a mobile-type local connection service. In other words, when the connection of the UE 10 is permitted by the forwarding node 20, the connection confirmation unit 84 forwards, to the inquiry processing unit 82, the acquired connection ID, information for connecting to the forwarding node 20 (e.g., access information such as frequency information or SSID), and the like. When a connection acknowledgment response message indicative of the permission of connection includes a list of contents or categories stored in the forwarding node 20, the determination results of the content consistency and the cache consistency (information indicative of approval/disapproval (bit values or the like) or numeric values indicative of consistencies), or information (addresses such as URLs or categories of Web pages) on cached Web pages, they are also notified to the inquiry processing unit 82. In response to this, the inquiry processing unit 82 sends the UE 10 a neighboring NW response message with the information acquired from the connection confirmation unit 84 included as the information on the mobile-type local connection service (step S57). At this time, the inquiry processing unit 82 can notify the UE 10 of the information together with information on any other local connection service regardless of a mobile type or a fixed type.

Third Embodiment

In a third embodiment, operation when the UE 10 moves from the moving body 110 to a stationary body 1001 or another moving body will be described. Here, the operation features that the moving body 110 and a stationary body 1001 or the other moving body have a relationship of approaching each other, which corresponds, for example, to a case of getting off a train (the moving body 110) at a platform (stationary body 1001) or a case of transferring from one train (the moving body 110) to the other train or a bus (the other moving body).

<System Configuration>

Figure 14:
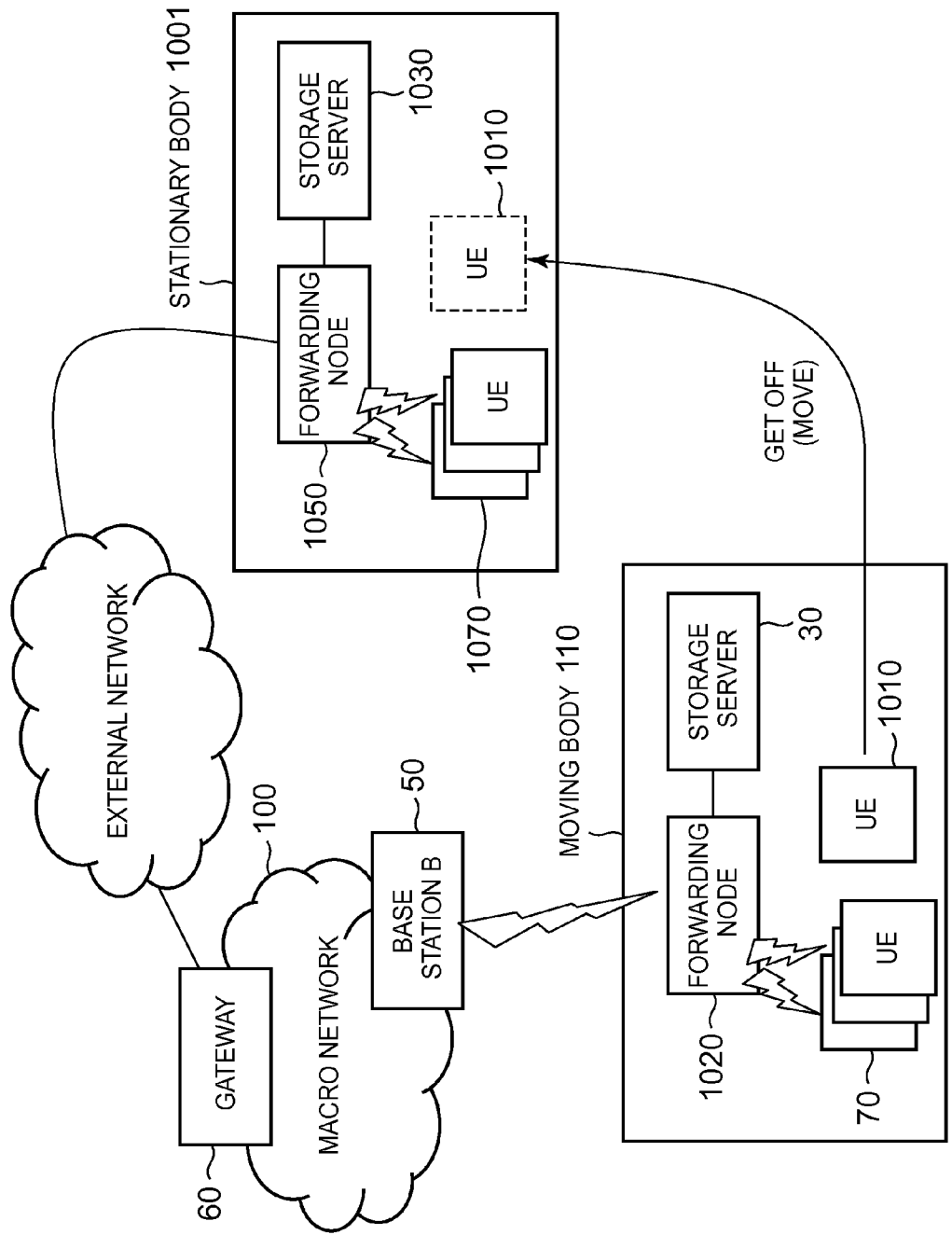
FIG. 14 is a diagram showing a system configuration according to the second embodiment of the present invention.

FIG. 14 is a diagram showing a system configuration according to the third embodiment of the present invention. In FIG. 14, a stationary body 1001 is added in addition to the entities shown in FIG. 1. When the moving body 110 is a train, the stationary body 1001 corresponds to a station platform or the like, having a forwarding node 1050 and a storage server 1030 like the moving body 110. In some cases, multiple UEs 1070 are connected to the forwarding node 1050 in the stationary body 1001.

An external network is a communication network enabling interconnections between nodes connecting to the macro network 100 (e.g., UE 70, UE 1010 (before moving), forwarding node 1020, and the like) and nodes in the stationary body 1001 (e.g., UE 1070, UE 1010 (after moving), forwarding node 1050, and the like), which corresponds to a collection of communication units for satisfying the function such as the Internet or a private network. Here, the forwarding node 1050 may also connect to the macro network 100 via a base station B50 like the forwarding node 1020. In such a case, since the interconnection between a node in the moving body 110 and a node in the stationary body 1001 is closed in the macro network 100 or the base station B50, no external network is needed. When the forwarding node 1050 connects to the macro network 100 via a base station different from the base station B50, since the interconnection is also closed in the macro network 100, no external network is needed.

The following will describe a case where the UE 1010 moves (gets off) from the moving body 110 to the stationary body 1001.

<System Operation>

Figure 15:
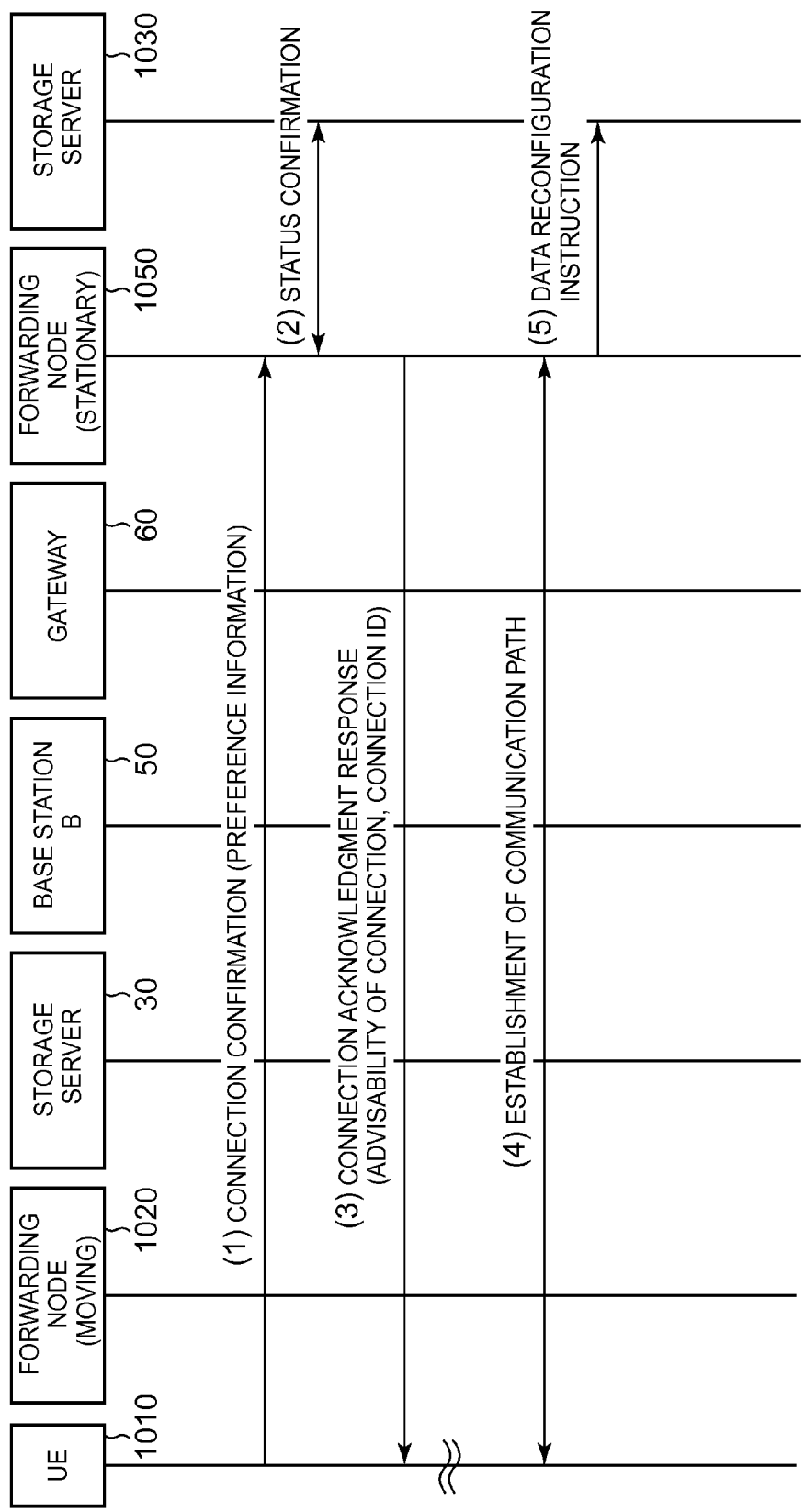
FIG. 15 is a communication sequence chart for describing a first operation of the system of FIG. 14.

A first operation of a system having the above configuration will be described with reference to FIG. 15. In the first operation, like that shown in the first embodiment, the UE 1010 on the moving body 110 connects directly to a forwarding node 1050 as a destination where the user will get off to make an inquiry about the advisability of connection.

(1) Connection Confirmation: The UE 1010 makes connection confirmation to the forwarding node 1050 on the stationary body 1001. Through the connection confirmation processing, the UE 1010 confirms the effectiveness of connecting to the forwarding node 1050 installed on a platform (stationary body 1001) at which the user is scheduled to get off. In other words, the UE 1010 sends the forwarding node 1050 a connection confirmation message with preference information on the user of the UE 1010 included therein.

Here, an identifier (IP address or the like) of the forwarding node 1020 being connected may be included instead without particularly including preference information in the connection confirmation message. The forwarding node 1050 receiving the connection confirmation message can access the forwarding node 1020 to acquire preference information corresponding to the UE 1010. This eliminates the need for the UE 1010 to collect and organize preference information anew, enabling reduction in the processing load on the UE 1010. Further, since the status of the storage server 30 about the UE 1010 at the time can be forwarded, the load on the storage server 1030 to reconfigure a database or a cache can also be reduced.

The UE 1010 can get the address (IP address) of the forwarding node 1050 as follows: For example, the UE 1010 has a list (e.g., a time table listing IP addresses each of which is assigned to each station (or a combination of a station and a boarding track number) of fixed IP addresses each of which is assigned to each stationary body 1001 (platform) (i.e., the IP address is assigned to the forwarding node 1050) to select therefrom a desired station based on operational information about a train car to board (e.g., train ID, boarding line and boarding time, car number, station scheduled to stop next, boarding track number scheduled to stop, and the like) to extract an IP address. The UE 1010 may also make an inquiry to a DNS (Domain Name System) server, not shown in the figures, about an identifiable name assigned to each station or station track number in the same manner (e.g., an identifier in the URI (Uniform Resource Locator) format) to acquire a corresponding IP address. Further, an identifier for identifying a train may be created from information such as a boarding station, a boarding scheduled time, a boarding track number, a terminal station, and a starting station to make an inquiry to the DNS server or the like to acquire a corresponding IP address. From the DNS server or the like, an IP address assigned to a station to stop next from the time when receiving the inquiry or a list of IP addresses assigned to a station to stop next and subsequent stations or station track numbers are given to the UE 1010 as a reply.

(2) Status Response: The forwarding node 1050 receiving the connection confirmation message confirms the effectiveness of connecting to the forwarding node 1050 after the UE 1010 gets off based on the preference information notified (or acquired from the forwarding node 1020) (status confirmation processing for the storage server 1030). In other words, confirmation is made as to:

whether a content desired by the UE 1010 is already stored in the storage server 1030, or whether the content can be acquired and stored from an external server or the like (the confirmation of content consistency; for example, that the content is not permitted to acquire and store because of the author's right or copyright), or whether currently cached data in the storage server 30 is appropriate for the preference of the UE 10 (the confirmation of cache consistency; as to whether the cached data matches with at least data indicated in access history information notified through the preference information, or whether cached data on similar Web pages exceed a predetermined number).

Further, in the connection confirmation processing, when information on a train the user of the UE 1010 is scheduled to get on next can be acquired, a scheduled moving distance or a scheduled moving time after getting off until the user gets on a target train may be so calculated that when it is a short distance or a short time, the connection to the forwarding node 1050 will not be permitted.

Here, for example, information on transfer may be extracted based on information such as a ticket or a train ticket held by the user of the UE 10 or a ticket or a train ticket stored in the UE 10. This can prevent processing for reconfiguring cache status for the UE 1010 only using the cache for a short time and acquiring content data to reduce the processing loads on the forwarding node 1050 and the storage server 1030. In addition, resources allocated to processing for the UE 1010 connecting for a longer time than the others can be improved, thereby improving the operational efficiency of the entire system.

(3) Connection Acknowledgment Response: When both or either of the content consistency and the cache consistency agrees on the condition, the forwarding node 1050 sends the UE 1010 a connection acknowledgment response message for permitting the connection (including information indicative of the approval of connection). The forwarding node 1050 may assign a connection ID for identifying the UE 1010 the connection of which is permitted, and notify the UE 1010 thereof using the connection acknowledgment response message.

(4) Establishment of Communication Path: When the UE 1010 gets off at the stationary body 1001 with the forwarding node 1050 thereon so that the UE 1010 will be connectable to the forwarding node 1050, the UE 1010 connects to the forwarding node 1050.

(5) Data Reconfiguration Instruction: The forwarding node 1050 instructs the storage server 1030 to reconstruct and organize content data for the UE 1010. The connection ID previously assigned is included in a message so that the forwarding node 1050 can identify the UE 1010 correctly and instruct the storage server 1030 if needed to configure the cache status according to the preference of the UE 1010 or replenish contents from an external server or the like. In configuring the cache status, for example, a search key or a search hash value is (totally or partially) reconfigured to improve search performance for an URL or cached data appropriate for the preference of the UE 1010, data on associated Web sites are collected based on the Web access history acquired from the UE 1010 and stored as cached data, or cache information acquired from the UE 1010 or the storage server 30 (via the forwarding node 1020) on the moving body 110 is set in a database.

In (1) Connection Confirmation mentioned above, when a platform as the stationary body 1001 is made up of multiple sections and each section has a forwarding node 1050, connection confirmation is made to a forwarding node (tentatively referred to as 1050*a*) as a representative of forwarding nodes. The representative forwarding node 1050*a* performing connection confirmation processing confirms cache status and content holding status in the storage server 1030 via another forwarding node 1050 on the stationary body 1001 between the forwarding nodes 1050*a* and 1050 (via a local line in the stationary body 1001 or via a WAN line) to make a connection determination on the UE 1010. This enables the UE 1010 to avoid making connection confirmation to each of the multiple forwarding nodes 1050 on the same stationary body 1001 individually to reduce the processing time and hence improve user convenience.

Further, in (3) Connection Acknowledgment Response mentioned above, the connection ID is uniquely assigned in the stationary body 1001 so that even when the UE 1010 accesses any forwarding node 1050 in the stationary body 1001 later, cached data or a content appropriate for the preference of the UE 1010 can be identified based on the connection ID, and shared among the forwarding nodes 1050. This can make the system resources useful even when each of the forwarding nodes 1050 has an individual storage server 1030 to perform cache and content storage individually, and hence improve the user convenience of the local connection service. Further, the section number with the highest effectiveness of using the cache/content when the UE 1010 gets off or section numbers listed in descending order of effectiveness may be notified through a connection acknowledgment response message for the purpose of reducing the system load due to sharing of cached data or contents among the forwarding nodes 1050 so that a section (a position on the platform) to get off or a drop-off station will be decided based on the section number or the list acquired by the user in order to make the effectiveness of connection (i.e., the effectiveness of connecting to the forwarding node 1050) higher.

Further, when two or more addresses are obtained as a result of derivation of forwarding nodes 1050, the UE 1010 performs, on each of the forwarding nodes 1050, connection confirmation processing at (1) as mentioned above to manage and hold an acquired connection ID for each of the forwarding nodes 1050. This is a situation when the UE 1010 can acquire only simple train information (e.g., a train heading for Tokyo station from Shinjuku station, or the like) or cannot identify even train information (i.e., it can acquire only position information). In this case, the address of a forwarding node 1050 installed on a platform in a station possibly to get off at the time is derived from the identifiable train or the position information.

In (4) Establishment of Communication Path mentioned above, the UE 1010 establishes a connection using a connection ID acquired from a corresponding forwarding node 1050. The forwarding node 1050 to which the UE 1010 established the connection establishes an environment suitable for the UE 1010 if needed (the details are as mentioned above). Here, at the point of deciding on a forwarding node 1050 to which a connection is established, processing for releasing the context (connection ID, holding of preference information on the UE 10, and the like) as a result of the connection confirmation processing previously performed on any other forwarding node may be performed (i.e., sending a request message and receiving a response message indicative of completion of release at the forwarding node). In addition, information (on the forwarding nodes 1050 to which no connection was established this time) held by the UE 1010 may also be released. This can reduce the consumption of resources on the UE 1010 and the forwarding node 1050. As for a stationary body 1001 as a station of a transfer destination through which the train passes, the context generated by the connection confirmation processing may be maintained to enable reduction in the processing load for generating the context again.

When the UE 1010 has started connection processing to a forwarding node (tentatively called a forwarding node 2) different from a forwarding node (tentatively called a forwarding node 1) to which the connection confirmation was made, the following processing may be performed: For example, an address or an identifier for allowing the forwarding node 2 to connect to the forwarding node 1 is acquired (i.e., the address or the identifier of the forwarding node 1 when connection confirmation from the UE 10 was made is acquired, or a moving body at which the user of the UE 1010 was likely to get off, and the address or the identifier of the forwarding node 1 are extracted from exit information based on a ticket or a commuter pass of the user of the UE 1010, position information when the connection confirmation was made, platform information, and the like) to connect to the forwarding node 1 in order to acquire, from the forwarding node 1, preference information on the UE 1010 and connection advisability information, and further configuration information for the UE 1010 (information on the settings of the forwarding node and the storage server when the UE 1010 establishes a connection, information on a cache already downloaded or reconfigured, and the like). Then, based on the acquired configuration information, the settings of the forwarding node 2 and the storage server to connect are configured and organized for the UE 1010.

Further, when the user of the UE 1010 gets on a stationary body different from a stationary body in which such a forwarding node that has already made connection confirmation is installed, or when the UE 1010 cannot find a forwarding node (forwarding node 1) that made the connection confirmation after the user gets off, the UE 1010 performs connection confirmation processing again to connect to a forwarding node (forwarding node 2) installed on the stationary body at which the user got off. At this time, the above information on the UE 1010 may be forwarded between the forwarding node 1 and the forwarding node 2. Further, the information may be forwarded between the forwarding node 1 and the forwarding node 2 in the process of connection processing performed by the UE 1010 on the forwarding node 2, or when the UE 1010 connects to the forwarding node 2. In other words, the UE 1010 sends the forwarding node 2 a connection confirmation request including the address or the identifier of the forwarding node 1 that previously made the connection confirmation. The forwarding node 2 acquires configuration information on the UE 1010 from the forwarding node 1, and based on preference information on the 1010 acquired from the acquired configuration information on the UE 1010 and the connection confirmation request, the forwarding node 2 performs status response processing. Alternatively, as mentioned above, information on the UE 1010 is forwarded when the UE 1010 connects to the forwarding node 2.

Figure 16:
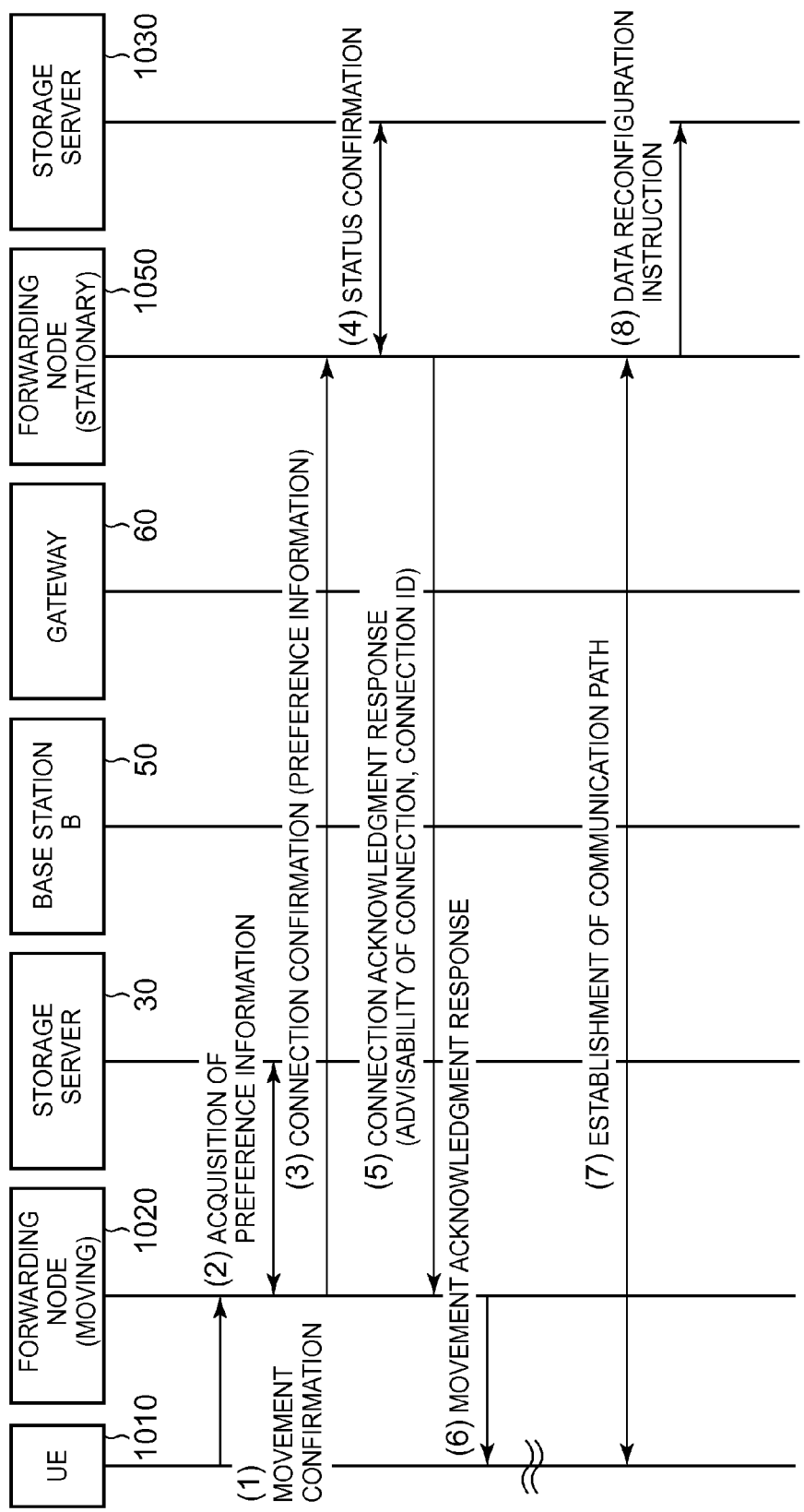
FIG. 16 is a communication sequence chart for describing a second operation of the system of FIG. 14.

Next, a second operation of the system having the above configuration will be described with reference to FIG. 16. In the second operation, the UE 1010 on the moving body 110 issues a movement confirmation to the forwarding node 1020 to which the UE 1010 is connecting so that the forwarding node 1020 connects to the forwarding node 1050 as a drop-off destination to make an inquiry about the advisability of connection.

(1) Movement Confirmation: When the UE 1010 detects that drop-off timing is coming (for example, the remaining time before getting off falls below a certain value, when distance to a drop-off position falls below a certain value, or the like), a movement confirmation message is sent to the forwarding node 1020 to which the UE 1010 is connecting. Note that the forwarding node 1020 may detect an equivalent condition to perform the subsequent processing. In such a case, the UE 1010 does not perform the above detection processing and transmission processing the movement confirmation message, and the forwarding node 1020 mainly performs the subsequent processing.

(2) Acquisition of Preference Information: When the forwarding node 1020 acquires the movement confirmation message or detects the above condition, the forwarding node 1020 acquires preference information on the UE 1010 and information on the stored state of content data from the storage server 30. The preference information may be acquired from the UE 1010 by using the movement confirmation message. In this case, temporary (real-time) preference information based on the state of the UE 1010 itself can be acquired.

(3) Connection Confirmation: The forwarding node 1020 identifies a stationary body 1001 (station platform or the like) as a drop-off destination of the UE 1010 by a method as mentioned above to derive the address of a forwarding node 1050 installed in the stationary body 1001. The forwarding node 1020 sends the forwarding node 1050 a connection confirmation message including the acquired preference information.

(4) Status Confirmation: Based on the notified preference information, the forwarding node 1050 receiving the connection confirmation message evaluates the effectiveness/ineffectiveness and advantage of the connection of the UE 1010 to the forwarding node 1050 by a method as mentioned above (i.e., status confirmation processing is performed on the storage server 1030).

(5) Connection Acknowledgment Response: When both or either of the content consistency and the cache consistency agrees on the condition, the forwarding node 1050 sends the forwarding node 1020 a connection acknowledgment response message for permitting the UE 1010 to establish a connection (including information indicative of the approval of connection). At this time, the forwarding node 1050 may assign a connection ID for identifying the UE 1010 and give notice thereof by using the connection acknowledgment response message.

(6) Movement Acknowledgment Response: When receiving the connection acknowledgment response message, the forwarding node 1020 confirms the advisability of connection to the UE 1010. When the connection is possible, the forwarding node 1020 sends the UE 1010 a movement acknowledgment response message including information indicative of the approval of connection and the received connection ID. In the case where the result noticed from the forwarding node 1050 is the disapproval of connection, if remote connection to itself is possible, the forwarding node 1020 will assign an address for remote connection and a connection ID (option), and notify the UE 1010 thereof together with information indicative of being connectable by using the movement acknowledgment response message. When the notification result from the forwarding node 1050 is the disapproval of connection and the remote connection to itself is impossible, the address of an external server is acquired and notified to the UE 1010 together with information indicative of being connectable by using the movement acknowledgment response message. When acquisition of the address of an external server is failed, a movement acknowledgment response message including information indicative of the disapproval of connection is sent to the UE 1010.

(7) Establishment of Communication Path: When the UE 1010 can acquire information for connecting to the forwarding node 1050, the UE 1010 connects to the forwarding node 1050 after that through a local wireless network (in addition to the wireless LAN, which may be, for example, Bluetooth (registered trademark), access via a non-contact IC, or millimeter-wave radio) when the UE 10 gets off at the stationary body 1001 in which the forwarding node 1050 is installed. When information for remote access (the address of the forwarding node 1020, the connection ID, and the like) is notified through the movement acknowledgment response at (6), the UE 1010 once connects to the forwarding node 1050 as a drop-off destination or any other access system, and based on the information for remote access, the UE 1010 then connects to the forwarding node 1020 connected before getting off. This enables the UE 1010 to continue to use a content stored in the storage server 30 corresponding to the forwarding node 1020. Further, when the address of an external server is notified through the movement acknowledgment response at (6), the UE 1010 establishes a connection to the address of the external server after getting off so that the UE 1010 can use contents stored in the external server.

(8) Data Reconfiguration Instruction: At this time, the connection ID previously assigned is included in a message so that the forwarding node 1050 can identify the UE 1010 correctly and instruct the storage server 1030 if needed to configure the cache status according to the preference of the UE 10 or replenish contents from an external server or the like. In configuring the cache status, for example, a search key or a search hash value is (totally or partially) reconfigured to improve search performance for an URL or cached data appropriate for the preference of the UE 1010, data on associated Web sites are collected based on the Web access history acquired from the UE 1010 and stored as cached data, or cache information acquired from the storage server 30 (via the forwarding node 1020) on the moving body 110 is set in a database.

<Structure of Forwarding Node>

Figure 3:
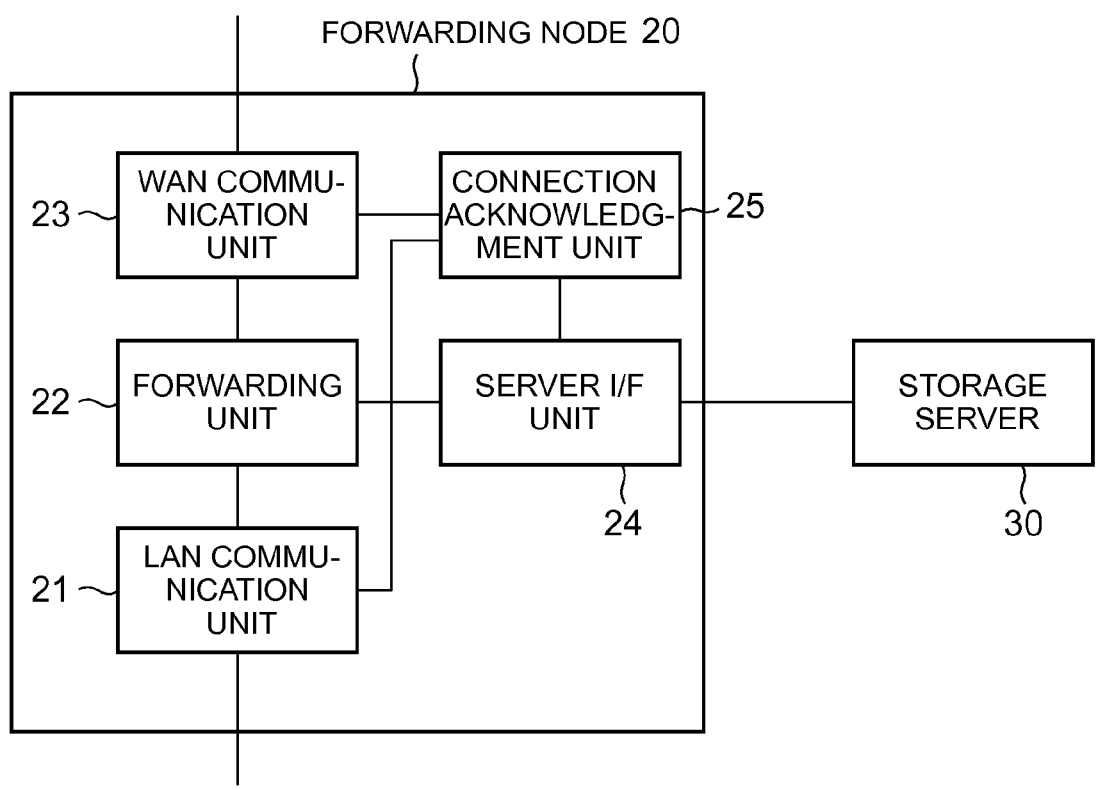
FIG. 3 is a block diagram showing a forwarding node of FIG. 1 in detail.

Since the structure of the forwarding nodes 1020 and 1050 according to the third embodiment is the same as that shown in FIG. 3, the description will be omitted here.

<Processing at Forwarding Node>

Figure 17:
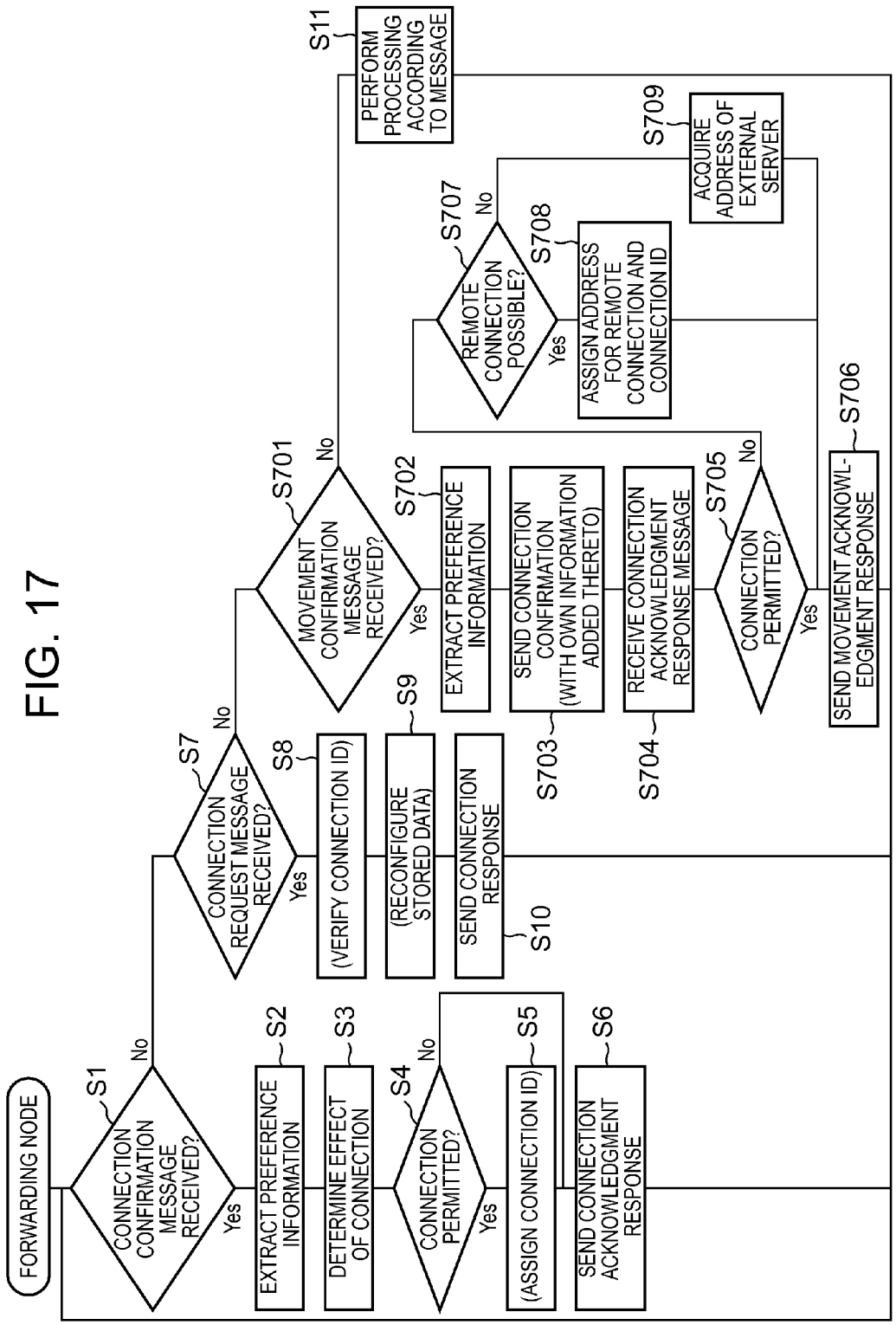
FIG. 17 is a flowchart for describing the operation of a forwarding node in a stationary body shown in FIG. 14.

The operation of the forwarding node 1050 structured as mentioned above and regarding connection confirmation and connection processing will be described with reference to FIG. 17. Note that basic processing is the same as that shown in FIG. 4. Since FIG. 17 is different from FIG. 4 in processing when the determination in step S7 is No, only the different points will be described here.

When receiving a movement confirmation message via the LAN communication unit 21 (step S701), the connection acknowledgment unit 25 acquires preference information on the UE 1010 as the source of the movement confirmation message from the storage server 30 via the server I/F unit 24 (step S702). If it can be detected that the remaining time before the user gets off falls below a certain value or distance to a drop-off position of the user falls below a certain value, the processing may also be started based on the event instead of receiving the movement confirmation message. Further, the preference information may be acquired from the UE 1010 by using the movement confirmation message. In this case, temporary (real-time) preference information based on the state of the UE 1010 itself can be acquired.

The connection acknowledgment unit 25 identifies a stationary body 1001 (station platform or the like) as a drop-off destination of the UE 1010 by a method as mentioned above to derive the address of a forwarding node 1050 installed in the stationary body 1001. The forwarding node 1020 sends the forwarding node 1050 a connection confirmation message including the acquired preference information. At this time, the connection acknowledgment unit 25 sends the connection confirmation message with information on the own node (own information, e.g., an identifier such as the address) added thereto (step S703). The connection confirmation message is sent to the base station through the WAN communication unit 23.

When receiving, through the WAN communication unit 23, a connection acknowledgment response message corresponding to the connection confirmation message previously sent (step S704), the connection acknowledgment unit 25 confirms the advisability of connection to the UE 1010 based on the content of the message (step S705).

When the connection is possible, the connection acknowledgment unit 25 sends a movement acknowledgment response message including information indicative of being connectable and the received connection ID to the UE 1010 (step S706).

In the case where the connection is disapproved, if remote connection to itself is possible (for example, when a port for remote connection is set and usable correctly, or when the UE 1010 has authority for remote connection and an account) (step S707), an address for remote connection and an connection ID (option) will be assigned (step S708), included in the movement acknowledgment response message together with information indicative of being connectable, and sent to the UE 1010 (step S706).

When the notification result from the forwarding node 1050 is the disapproval of connection and the remote connection to itself is impossible, the address of an external server is acquired (step S709), included in the movement acknowledgment response message together with information indicative of being connectable, and sent to the UE 1010 (step S706).

When acquisition of the address of an external server is failed, a movement acknowledgment response message including information indicative of the disapproval of connection is sent to the UE 1010.

<Structure of Mobile Terminal>

Figure 5:
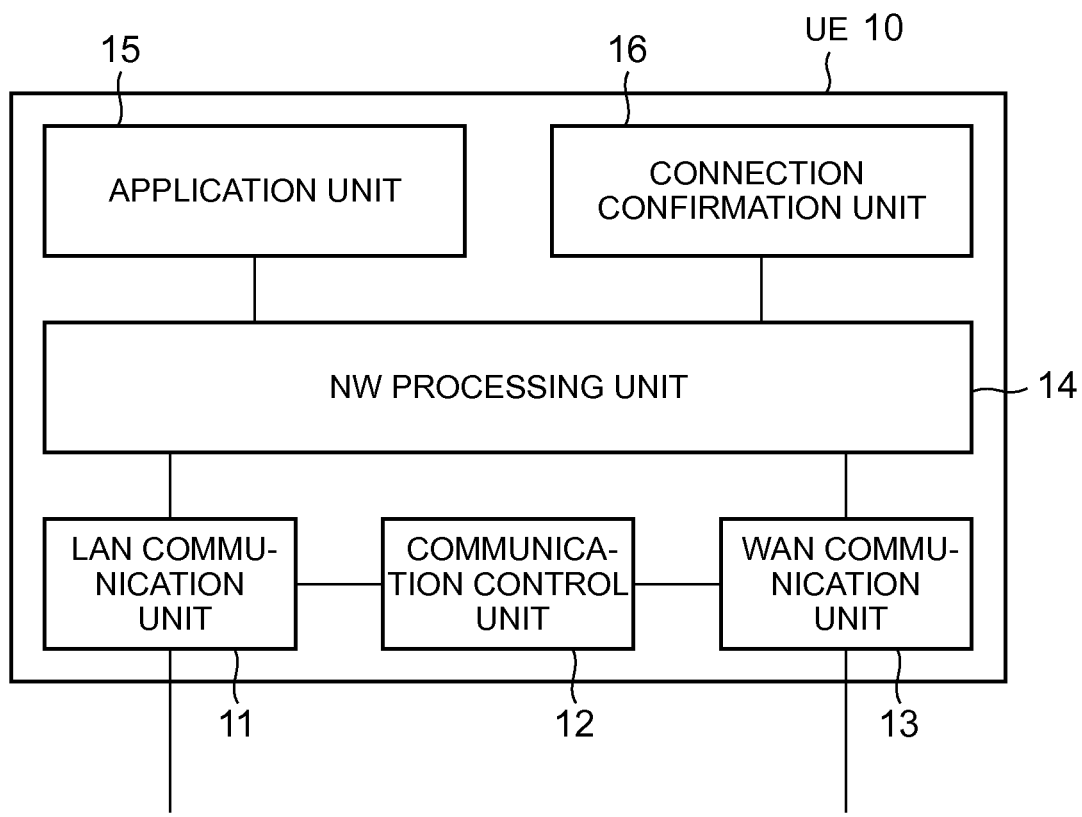
FIG. 5 is a block diagram showing a UE of FIG. 1 in detail.

Since the structure of the UE 1010 according to the third embodiment is the same as that shown in FIG. 5, the description will be omitted here.

<Processing at Mobile Terminal>

Figure 18:
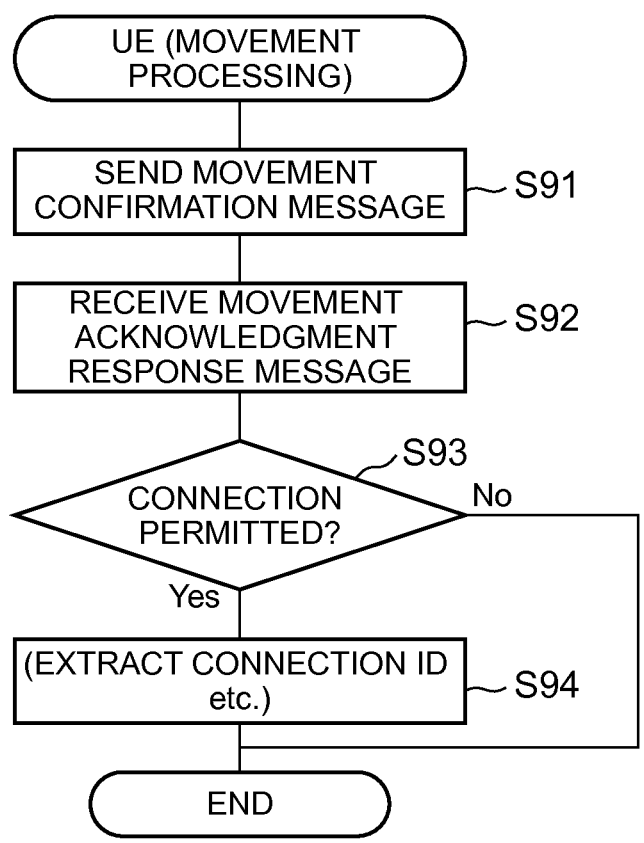
FIG. 18 is a flowchart for describing the operation of a UE moving to the stationary body shown in FIG. 14.

The operation of the UE 1010 structured as mentioned above and regarding movement processing will be described with reference to FIG. 18. Since the operation of the UE 1010 corresponding to the system operation described above with reference to FIG. 15 is the same as the search processing shown in FIG. 6, the description will be omitted here.

The operation of the UE 1010 corresponding to the operation described with reference to FIG. 16 will be described below as the system operation.

When the user moves to a stationary body at which the user is scheduled to get off and gives an instruction to start movement processing for continuing the local connection service (or simply input a signal for declaring the user's intention), the connection confirmation unit 16 sends a movement confirmation message to the forwarding node 1020 via the LAN communication unit 11 (step S91). Then, when receiving a movement acknowledgment response message, the LAN communication unit 11 forwards this to the connection confirmation unit 16 (step S92), and the connection confirmation unit 16 confirms the advisability of connection to the forwarding node 1050 in the stationary body based on information included in the message (step S93). When the connection is permitted (Yes in step S93), if a connection ID is included in the movement acknowledgment response message, the connection ID will be extracted and stored (step S94).

Further, when information necessary for connection to the forwarding node 1050 (e.g., frequency information on an access point or master key information such as SSID (Service Set IDentification), WEP (Wired Equivalent Privacy), or WPA (Wi-Fi Protected Access) in the case of WiFi (registered trademark), or an access point name and path code for pairing in the case of Bluetooth (registered trademark) is included in the movement acknowledgment response message, they are extracted and stored. For example, this can be set as the configuration of the LAN communication unit 11 so that the UE 1010 can automatically detect an access point to establish a connection after that.

Since connection processing after the UE 1010 moves to the stationary body 1001 is the same as that described with reference to FIG. 7, the description will be omitted here.

The above description takes a case where a UE gets out of a moving body into a stationary body, but continuous access to a content can be realized by the same method when the UE transfers from the moving body to another moving body and when the UE moves from the stationary body to get on the moving body.

Each functional block used in the explanation of the aforementioned embodiments can be realized as an LSI (Large Scale Integration) that is typically an integrated circuit. Each functional block can be individually formed into a single chip, or some or all of the functional blocks can be included and formed into a single chip. Although referred to here as the LSI, the integrated circuit may be referred to as an IC, a system LSI, a super LSI, or an ultra LSI depending on differences in integration. The method of forming the integrated circuit is not limited to LSI and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured may be used. Further, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

When a mobile terminal moves from a platform into a moving body such as a train, the present invention can prevent the mobile terminal from unnecessary connection establishment to a local connection service provided by a mobile router in the moving body to prevent inefficient local connection, having the advantage of being able to improve user convenience. An information forwarding device of the present invention can be used as a mobile router having a handover function between 3GPP (3rd Generation Partnership Project) network-WLAN or a mobile relay having a handover function between 3GPP macro networkE3GPP local network.

The invention claimed is:

1. A connection establishment method by which a mobile terminal connects to a local connection service provided in a moving body, the moving body having an information forwarding device and a storage server connected to the information forwarding device, the information forwarding device being an access point of the mobile terminal to forward information to the mobile terminal, the storage server storing contents and cached data, the method comprising:
sending, by the mobile terminal, preference information regarding a user of the mobile terminal before the mobile terminal connects to the information forwarding device;
determining, by the information forwarding device, based on the preference information, whether the contents or the cached data stored in the storage server are appropriate for the user of the mobile terminal;
sending a result of the determining to the mobile terminal before the mobile terminal connects to the information forwarding device; and
when the mobile terminal becomes connectable to the information forwarding device, not connecting the mobile terminal to the information forwarding device if the connects or the cached data stored in the storage server are not appropriate for the user of the mobile terminal based on the result, and connecting the mobile terminal to the information forwarding device if the contents or the cached data stored in the storage server are appropriate for the user of the mobile terminal based on the result.

2. The connection establishment method according to claim 1, wherein the preference information regarding the user of the mobile terminal and the result from the information forwarding device are transmitted through a WAN connection.

3. The connection establishment method according to claim 1, further comprising;
holding, by a server, neighborhood information regarding another information forwarding device to forward the preference information to, the information forwarding device being a device to which the mobile terminal is going to connect, before the mobile terminal connects to the other information forwarding device.

4. A communication system in which a mobile terminal connects to a local connection service provided in a moving body, the moving body having an information forwarding device and a storage server connected to the information forwarding device, the information forwarding device being an access point of the mobile terminal to forward information to the mobile terminal, the storage server storing contents and cached data, the system comprising:
first communication circuitry in the mobile terminal, which in operation sends preference information regarding a user of the mobile terminal before the mobile terminal connects to the information forwarding device;
connection acknowledgment circuitry in the information forwarding device, which in operation determines, based on the preference information, whether the contents or the cached data stored in the storage server are appropriate for the user of the mobile terminal;
second communication circuitry coupled to the connection acknowledgment circuitry in the information forwarding device, which in operation sends a result of processing performed by the connection acknowledgement circuitry to the mobile terminal before the mobile terminal connects to the information forwarding device; and
connection confirmation circuitry coupled to the first communication circuitry in the mobile terminal, which in operation, when the mobile terminal becomes connectable to the information forwarding device, does not cause the mobile terminal to connect to the information forwarding device if the contents or the cache data stored in the storage server are not appropriate for the user of the mobile terminal based on the result, and causes the mobile terminal to connect to the information forwarding device if the contents or the cached data stored in the storage server are appropriate for the user of the mobile terminal based on the result.

5. The communication system according to claim 4, further comprising:
holding circuitry, in a server, which in operation holds neighborhood information regarding another information forwarding device to forward the preference information to, the information forwarding device being a device to which the mobile terminal is going to connect, before the mobile terminal connects to the other information forwarding device.

6. An information forwarding device installed in a moving body as an access point of a mobile terminal to forward information to the mobile terminal in a communication system in which the mobile terminal connects to a local connection service provided in the moving body, the device comprising:
first communication circuitry, which in operation receives preference information regarding a user of the mobile terminal sent by the mobile terminal before the mobile terminal connects to the information forwarding device; and
connection acknowledgment circuitry coupled to the first communication circuity, which in operation determines based on the preference information, whether contents or cached data stored in a storage server connected to the information forwarding device are appropriate for the user of the mobile terminal, when the mobile terminal becomes connectable to the information forwarding device,
wherein the first communication circuitry in operation sends a result of processing performed by the connection acknowledgment circuitry to the mobile terminal before the mobile terminal connects to the information forwarding device, the result indicating approval of connection when the connection acknowledgment circuitry determines the contents or cached data stored in the storage server are appropriate for the user of the mobile terminal, and the result indicating disapproval of connection when the connection acknowledgment circuitry determines the contents or cached data stored in the storage server are not appropriate for the user of the mobile terminal; and forwards the information to the mobile terminal when the mobile terminal connects to the information forwarding device.

7. A mobile terminal for connecting to a local connection service provided in a moving body, the moving body having an information forwarding device and a storage server connected to the information forwarding device, the information forwarding device being an access point of the mobile terminal to forward information of the mobile terminal, the storage server storing contents and cached data, the terminal comprising:

communication circuitry, which in operation sends preference information regarding a user of the mobile terminal before connecting to the information forwarding device; and receives a result sent by the information forwarding device before connecting to the information forwarding device, where the result is based on the preference information as to whether the contents or the cached data stored in the storage server are appropriate for the user of the mobile terminal; and connection confirmation circuitry coupled to the communication circuitry, which in operation, when the mobile terminal becomes connectable to the information forwarding device, does not cause the mobile terminal to connect to the information forwarding device if the contents or the cached data stored in the storage server are not appropriate for the user of the mobile terminal based on the result, and causes the mobile terminal to connect to the information forwarding device if the contents or the cached data stored in the storage server are appropriate for the user of the mobile terminal based on the result.

8. The connection establishment method according to claim 1, wherein the preference information is information regarding contents of interest to the user of the mobile terminal or contents the user is scheduled to use, or information regarding a history of contents data accessed or Web accesses made in the past.

9. The information forwarding device according to claim 6, wherein the preference information is information regarding contents of interest to the user of the mobile terminal or contents the user is scheduled to use, or information regarding a history of contents data accessed or Web accesses made in the past.

10. The mobile terminal according to claim 7, wherein the preference information is information regarding contents of interest to the user of the mobile terminal or contents the user is scheduled to use, or information regarding a history of contents data accessed or Web accesses made in the past.

\* \* \* \* \*

UNITED STATES PATENT AND TRADEMARK OFFICE
CERTIFICATE OF CORRECTION

| | | |
|---|---|---|
| PATENT NO. | : 8,989,739 B2 | Page 1 of 1 |
| APPLICATION NO. | : 13/814474 | |
| DATED | : March 24, 2015 | |
| INVENTOR(S) | : Shinkichi Ikeda et al. | |

It is certified that error appears in the above-identified patent and that said Letters Patent is hereby corrected as shown below:

In the Claims

Column 29, Line 31:
"the connects or the cached data stored in the storage" should read, --the contents or the cached data stored in the storage--.

Signed and Sealed this
Fourth Day of August, 2015

Michelle K. Lee
*Director of the United States Patent and Trademark Office*